United States Patent
Jo et al.

(10) Patent No.: US 11,842,013 B2
(45) Date of Patent: Dec. 12, 2023

(54) TOUCH CONTROLLER, TOUCH SCREEN DRIVING CIRCUIT COMPRISING THE SAME, AND METHOD OF OPERATING TOUCH SCREEN DRIVING CIRCUIT

(71) Applicant: SAMSUNG ELECTRONICS CO., LTD., Suwon-si (KR)

(72) Inventors: Yunrae Jo, Yongin-si (KR); Yoon-Kyung Choi, Seongnam-si (KR); Jinbong Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 17/528,722

(22) Filed: Nov. 17, 2021

(65) Prior Publication Data
US 2022/0155937 A1  May 19, 2022

(30) Foreign Application Priority Data
Nov. 18, 2020  (KR) .......................... 10-2020-0154702

(51) Int. Cl.
  *G06F 3/041* (2006.01)
  *G06F 3/044* (2006.01)
  *G09G 3/3225* (2016.01)

(52) U.S. Cl.
  CPC ........ *G06F 3/04184* (2019.05); *G06F 3/0446* (2019.05); *G09G 3/3225* (2013.01); *G09G 2300/0426* (2013.01); *G09G 2300/0809* (2013.01); *G09G 2310/027* (2013.01); *G09G 2310/0286* (2013.01)

(58) Field of Classification Search
  CPC .. G06F 3/04184; G06F 3/0446; G06F 3/0443; G06F 3/0412; G06F 3/04166; G06F 3/044; G06F 3/0418; G09G 3/3225; G09G 2300/0426; G09G 2300/0809; G09G 2310/027; G09G 2310/0286; G09G 2310/061; G09G 2354/00
  See application file for complete search history.

(56) References Cited

U.S. PATENT DOCUMENTS

| | | | | |
|---|---|---|---|---|
| 6,067,066 A | * | 5/2000 | Kubota | ................ G09G 3/3655 345/98 |
| 7,038,666 B2 | | 5/2006 | Lo et al. | |

(Continued)

FOREIGN PATENT DOCUMENTS

| KR | 10-2016-0078751 A | 7/2016 |
|---|---|---|
| KR | 10-2020-0028274 A | 3/2020 |

*Primary Examiner* — Amy Onyekaba
(74) *Attorney, Agent, or Firm* — Sughrue Mion, PLLC

(57) ABSTRACT

A touch screen driving circuit for driving a touch screen which includes a display layer and a touch sensor layer on the display layer is provided. The touch screen driving circuit includes: a touch controller configured to provide a plurality of drive signals respectively to a plurality of first electrodes of the touch sensor layer, in a driving period, wherein the plurality of drive signals are phase synchronized during a first sub-period of the driving period; and a display driving circuit configured to provide a compensation signal to at least some of a plurality of source lines of the display layer in the first sub-period of the driving period, wherein the plurality of compensation signals are phase synchronized opposite to the plurality of drive signals in the first sub-period.

20 Claims, 19 Drawing Sheets

(56) References Cited

U.S. PATENT DOCUMENTS

| | | | |
|---|---|---|---|
| 9,195,353 B2 | 11/2015 | Byun et al. | |
| 9,367,164 B2* | 6/2016 | Wu | G06F 3/041 |
| 9,619,073 B2 | 4/2017 | Shin et al. | |
| 9,910,537 B2* | 3/2018 | Yang | G06F 3/04166 |
| 10,564,771 B2 | 2/2020 | Choi | |
| 10,573,265 B2 | 2/2020 | Jangda et al. | |
| 10,671,206 B1 | 6/2020 | Lin et al. | |
| 11,086,430 B2* | 8/2021 | Nitobe | G06F 3/0446 |
| 11,256,365 B2* | 2/2022 | Lee | G06F 3/041662 |
| 2013/0050130 A1* | 2/2013 | Brown | G06F 3/04184 |
| | | | 345/174 |
| 2013/0307817 A1* | 11/2013 | Kim | G06F 3/0412 |
| | | | 345/174 |
| 2015/0103038 A1* | 4/2015 | Han | G06F 3/0443 |
| | | | 345/98 |
| 2015/0220177 A1* | 8/2015 | Park | G06F 3/04184 |
| | | | 345/174 |
| 2017/0090673 A1* | 3/2017 | Kim | G06F 3/0418 |
| 2017/0185218 A1* | 6/2017 | Lee | G06F 3/04166 |
| 2018/0335888 A1* | 11/2018 | Endo | G06F 3/04166 |
| 2018/0366083 A1* | 12/2018 | Lai | G06F 3/0416 |
| 2019/0102017 A1 | 4/2019 | Kim et al. | |
| 2020/0027416 A1 | 1/2020 | Kim et al. | |
| 2020/0342196 A1* | 10/2020 | Chang | G09G 3/3688 |
| 2021/0208714 A1* | 7/2021 | Nagata | G06F 3/0443 |

* cited by examiner

TOUCH CONTROLLER, TOUCH SCREEN DRIVING CIRCUIT COMPRISING THE SAME, AND METHOD OF OPERATING TOUCH SCREEN DRIVING CIRCUIT

CROSS-REFERENCE TO RELATED APPLICATION

This application claims priority from Korean Patent Application No. 10-2020-0154702, filed on Nov. 18, 2020 in the Korean Intellectual Property Office, the disclosure of which is incorporated herein by reference in its entirety.

BACKGROUND

Methods, apparatuses and systems consistent with example embodiments relate driving a touch screen, and more particularly, to a touch controller for driving a touch screen, a touch screen driving circuit, and a method of operating a touch screen driving circuit.

Touch screens may include a display panel for image display and a touch panel for touch sensing, and the display panel and the touch panel may be vertically stacked or may be integrally formed by sharing at least one layer. As touch screen decreases, a distance between the display panel and the touch panel decreases, and thus, parasitic capacitance between electrodes of the two panels may increase. The parasitic capacitance may cause noise during touch sensing or image display, and the noise may lower touch sensing sensitivity or deteriorate the quality of a displayed image. Accordingly, a method of driving a touch screen, which may reduce noise due to parasitic capacitance, is needed.

SUMMARY

Example embodiments provide a touch controller to improve touch sensing sensitivity, a touch screen driving circuit, and a method of operating a touch screen driving circuit.

According to an aspect of an example embodiment, a touch screen driving circuit for driving a touch screen which includes a display layer and a touch sensor layer on the display layer is provided. The touch screen driving circuit includes: a touch controller configured to provide a plurality of drive signals respectively to a plurality of first electrodes of the touch sensor layer, in a driving period, wherein the plurality of drive signals are phase synchronized during a first sub-period of the driving period; and a display driving circuit configured to provide a compensation signal to at least some of a plurality of source lines of the display layer in the first sub-period of the driving period, wherein the plurality of compensation signals are phase synchronized opposite to the plurality of drive signals in the first sub-period.

According to an aspect of an example embodiment, a touch controller for driving a touch sensor array stacked on a display panel is provided. The touch controller includes: a controller configured to receive a display timing signal and generate a touch sensing control signal based on the display timing signal; and a driving circuit configured to provide, based on the touch sensing control signal, a plurality of drive signals having a first frequency respectively to a plurality of driving electrodes of the touch sensor array, wherein the plurality of drive signals have a second polarization opposite to a first polarization in a first period during which a compensation signal having the first polarization and the first frequency is provided to a plurality of source lines of the display panel.

According to an aspect of an example embodiment, a method of operating a touch screen driving circuit to drive a touch screen which includes a display layer and a touch sensor layer on the display layer is provided. The method includes: providing a plurality of drive signals respectively to a plurality of first electrodes of the touch sensor layer in a driving period, wherein the plurality of drive signals are phase synchronized during a first sub-period of the driving period; and providing a compensation signal to a plurality of source lines of the display layer in the first sub-period of the driving period, wherein the compensation signal is phase synchronized opposite to the plurality of drive signals in the first sub-period.

BRIEF DESCRIPTION OF THE DRAWINGS

The above, and other aspects, features and advantages will be more clearly understood from the following detailed description of example embodiments, taken in conjunction with the accompanying drawings in which.

DETAILED DESCRIPTION

Example embodiments will be described in detail with reference to the attached drawings.

Figure 1:
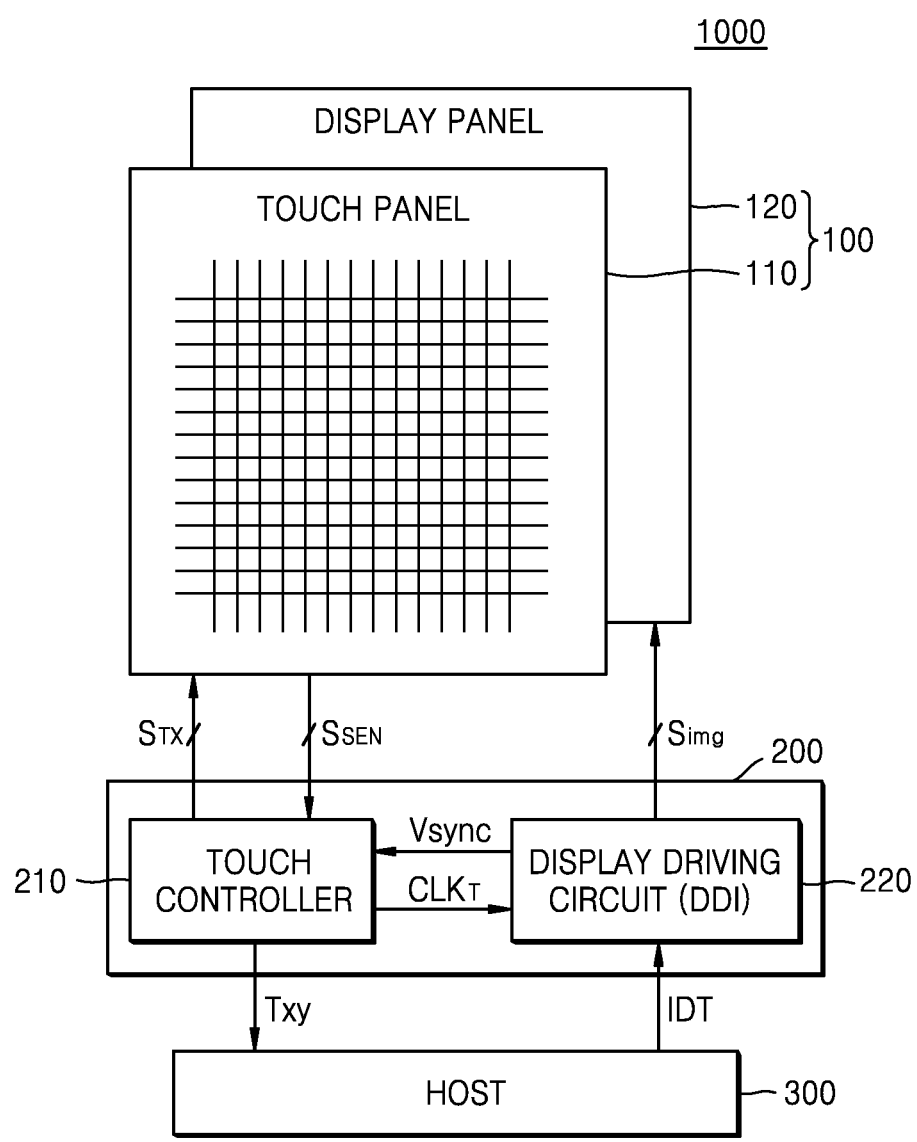
FIG. 1 is a block diagram of a touch screen device according to an example embodiment.

FIG. 1 is a block diagram of a touch screen device 1000 according to an example embodiment.

The touch screen device 1000 may be implemented in various electronic apparatuses. For example, the touch screen device 1000 may be provided in tablet personal computers (PCs), e-readers, personal digital assistants (PDAs), portable multimedia players (PMPs), mobile terminals, smartphones, wearable devices, Internet of Things (IoT) devices, refrigerators, navigation devices, and the like. In addition, the touch screen device 1000 may be mounted provided in vehicles, furniture, manufacturing equipment, doors, various measuring devices, and the like.

Referring to FIG. 1, the touch screen device 1000 may include a touch screen 100 and a touch screen driving circuit 200 (i.e., the driving circuit) for driving the touch screen 100, and the touch screen 100 may include a touch panel 110 and a display panel 120, and may provide a touch sensing and display function. The driving circuit 200 may include a touch controller 210 and a display driving integrated circuit (DDI) 220. Although FIG. 1 illustrates that the touch screen device 1000 includes a host 300, example embodiments are not limited thereto, and the host 300 may be implemented separately from the touch screen device 1000.

The touch screen 100 may display an image and receive a user's touch input. The touch screen 100 may be operated as an input/output device of an electronic apparatus. In an example embodiment, the touch screen 100 may further include a fingerprint sensor, and the touch screen device 1000 may perform a fingerprint recognition function.

The touch panel 110 may sense a touch or a touch input on the touch screen 100 and output sensing signals. A touch may include not only a direct contact of a conductive object, for example, a user's finger or palm, a touch pen, a stylus pen, and the like, on the touch screen 100, but also approaching of the conductive object with respect to the touch screen 100. The touch panel 110 may be stacked on the display panel 120, or attached on the front surface of the display panel 120, the front surface being, for example, a surface from which optical signals are emitted. In an example embodiment, the touch panel 110 may cover the front surface of the display panel 120.

The touch panel 110 may be implemented as a transparent panel having a touch-sensitive surface. Alternatively, the touch panel 110 may be implemented as a touch sensor array including a plurality of transparent electrodes arranged in a pattern. For example, the touch panel 110 may be referred to as a touch sensor array or a touch sensing layer.

The touch panel 110 may include a plurality of electrodes arranged in a matrix. Sensing signals according to one of various touch sensing methods may be output through a plurality of electrodes. In an example, a plurality of electrodes may output sensing signals according to a capacitance sensing method.

For example, the touch panel 110 may include a plurality of driving electrodes to which a drive signal $S_{TX}$ is applied and a plurality of receiving electrodes from which a sensing signal $S_{SEN}$ is output, and the driving electrodes may extend in a first direction, for example, either an X-axis direction or a Y-axis direction, and a plurality of sensing electrodes may extend in a second direction, for example, either the Y-axis direction or the X-axis direction. The driving electrodes and the sensing electrodes may intersect with each other, and mutual capacitance may be formed between the driving electrodes and the sensing electrodes.

In another example, the touch panel 110 may include sensing electrodes arranged in a matrix, and capacitance may be formed in each of the sensing electrodes. For example, capacitance may be formed between each of the sensing electrodes and ground, or a conductive layer in the touch screen device 1000, and the capacitance may be referred to as self-capacitance. The drive signal $S_{TX}$ may be applied to each of the sensing electrodes and also the sensing signal $S_{SEN}$ may be output from each of the sensing electrodes. In other words, each of the sensing electrodes may be operated as the driving electrode and the receiving electrode.

The drive signal $S_{TX}$ may be applied through the driving electrodes, the sensing signal $S_{SEN}$ indicating capacitance, for example, mutual capacitance or self-capacitance, may be generated based on the drive signal $S_{TX}$, and the sensing signal $S_{SEN}$ may be output through each of the receiving electrodes. When a conductive object such as a human's finger or a stylus touches or approaches an electrode, capacitance corresponding to a touched electrode may be changed, and the sensing signal $S_{SEN}$ output from the touch panel 110 may be changed according to the changed capacitance. For example, a level of the sensing signal $S_{SEN}$ may be increased or decreased compared to a level before the touch is generated.

The display panel 120 may include a plurality of gate lines, a plurality of source lines, and a plurality of pixels arranged in a matrix at positions where the gate lines and the source lines intersect with each other. The pixels may display an image based on an image signal $S_{img}$ received through the source lines and the gate lines. The image may be updated according to a set frame rate.

A display layer may be arranged under the display panel 120, for example, a backplane, and a common electrode may be arranged above the display panel 120. The common electrode may be provided between the display layer and the touch sensor array. The gate lines and the source lines, and the pixels may be formed in the display layer. A voltage, for example, a ground voltage, commonly provided to the pixels of the display panel 120 may be applied to the common electrodes.

The display panel 120 may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro-luminescent display (ELD), a vacuum fluorescent display (VFD), or various other types of a flat panel or a flexible panel.

Although FIG. 1 illustrates that the touch panel 110 and the display panel 120 are separate components, example embodiments are not limited thereto. For example, the touch screen 100 may be implemented as an in-cell type panel in which the electrodes of the touch panel 110 and the pixels of the display panel 120 are coupled to each other or an on-cell type panel in which the electrodes of the touch panel 110 are arranged above the display panel 120.

The touch controller 210 may scan, for example, drive and sense, the touch panel 110. The touch controller 210 may provide the drive signal $S_{TX}$ to the touch panel 110, that is, the touch sensor array, and receive, from the touch panel 110, the sensing signals $S_{SEN}$ generated based on the drive signal $S_{TX}$. The touch controller 210 may identify a touch input or a position where a touch input is generated, that is, touch coordinates Txy, based on the sensing signals, and provide the touch coordinates Txy to the host 300. In an example embodiment, the touch controller 210 may identify a touch pressure, and provide the touch pressure with the touch coordinates Txy to the host 300.

The DDI 220 may receive image data IDT from the host 300, and drive the display panel 120 so that an image corresponding to the image data IDT is displayed on the display panel 120. The DDI 220 may convert the image data IDT to image signals $S_{img}$ that are analog signals, and provide the image signals $S_{img}$ to the corresponding pixels of the display panel 120.

In the touch screen device 1000 according to an example embodiment, the touch controller 210 may drive the touch panel 110 in a multi-driving method. The touch controller 210 may generate the drive signal $S_{TX}$ by encoding a pulse signal, for example, a signal having a specific cycle and toggling between a high level and a low level, or a sine wave signal of a specific frequency, based on a specific matrix or a code, and simultaneously apply the drive signal $S_{TX}$ to a plurality of electrodes, for example, the driving electrodes. The touch controller 210 may generate a plurality of touch values corresponding to a plurality of drive signals by decoding the sensing signal $S_{SEN}$ received from the electrodes, for example, the receiving electrodes, based on the specific matrix, for example, an inverse matrix of the specific matrix.

In one period, for example, a first sub-period, of all driving periods to which the drive signals are applied, phases of the drive signals may be the same, or a sum of the phases of the drive signals, may be greater than zero. In another period, for example, a second sub-period that follows the first sub-period, of all driving periods, phases of some of the drive signals may be the same, phases of the other some of drive signals may be opposite to phases of some drive signals, and a sum of the phases of the drive signals may be zero. As such, a period, for example, the first sub-period, in which the sum of the phases of the drive signals is greater than zero, may be referred to as the unbalanced driving period, and a period, for example, the second sub-period, in which the sum of the phases of the drive signals is zero, may be referred to as the balanced driving period.

The touch controller 210 may determine the driving timing of the touch panel 110 such that the first sub-period of the driving period, that is, the unbalanced driving period, is included in a period in which an image is not updated in the display panel 120, for example, a blank period, and the DDI 220 may apply a compensation signal to at least some of the source lines of the display panel 120 in the unbalanced driving period. The compensation signal may have the same frequency as and a phase opposite to the drive signals applied to the driving electrodes in the unbalanced driving period.

The touch controller 210 and the DDI 220 may transmit/receive a synchronous signal, state information, and the like. For example, the DDI 220 may provide a signal indicating display timing, for example, a vertical synchronous signal Vsync, to the touch controller 210. The touch controller 210 may provide the DDI 220 with touch sensing timing information, for example, a touch clock signal $CLK_T$. The touch controller 210 and the DDI 220 may be operated by being synchronized with each other based on one or more of the synchronous signals, for example, the vertical synchronous signal Vsync, and the touch clock signal $CLK_T$. For example, the touch controller 210, based on the vertical synchronous signal Vsync, may perform unbalanced driving in the period in which no image is updated in the display panel 120, and the DDI 220, based on the touch clock signal $CLK_T$, may generate a compensation signal having the same frequency as and a phase opposite to the drive signal, and output the compensation signal through the source lines.

The host 300 may perform an overall control operation on the touch screen device 1000. The host 300 may generate data related to a display operation, provide the DDI 220 with the data. The host 300 may receive touch generation, touch coordinates Txy, touch pressure (strength), and the like, from the touch controller 210, interpret a touch based on the above, and perform a control operation according to a touch position and strength. The host 300 may generate the data related to the display operation based on the control operation.

In an example embodiment, the host 300 may include an application processor (AP), and the AP may be implemented as a system-on-chip (SoC). The SoC may include a system bus adopting a protocol having a standard bus specification, and may include various intellectual properties (IPs) connected to the system bus. As the standard specification of the system bus, various types of specifications such as the advanced microcontroller bus architecture (AMBA) protocol by Advanced RISC Machine (ARM), and the like may be employed.

Figure 2:
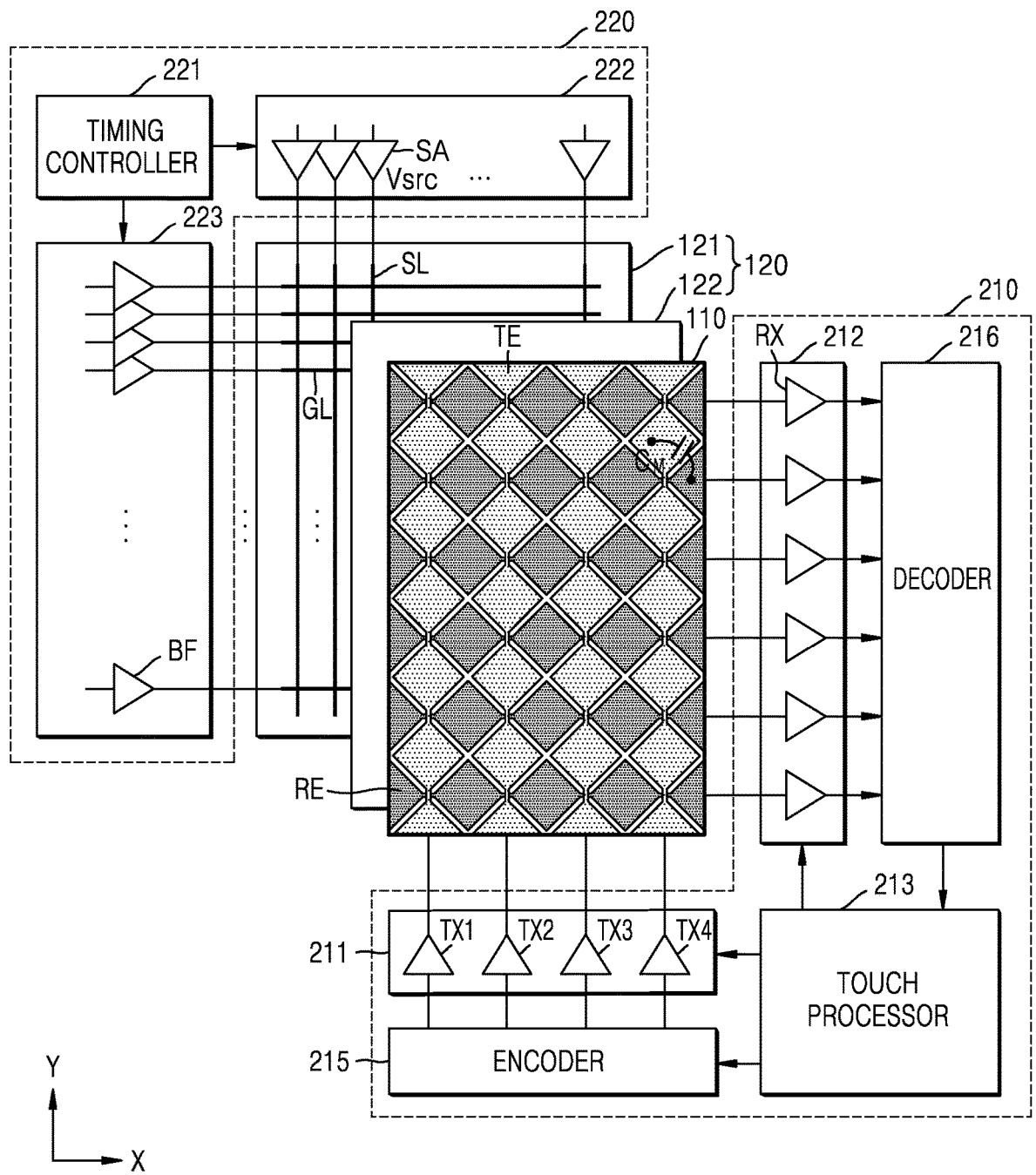
FIG. 2 is a diagram of a touch panel, a display panel, a touch controller, and a display driving circuit, which are provided in a touch screen device according to an example embodiment.

FIG. 2 is a diagram of the touch panel 110, the display panel 120, the touch controller 210, and the DDI 220, which are provided in a touch screen device according to an example embodiment.

Referring to FIG. 2, the touch panel 110 may include a plurality of driving electrodes TEs and a plurality of receiving electrodes REs, which may be referred to as the sensing electrodes. In an example embodiment, the receiving electrodes REs may extend in the first direction, for example, the X-axis direction, and the driving electrodes TEs may extend in the second direction, for example, the Y-axis direction. The first direction and the second direction are directions orthogonal to each other, and the receiving electrodes REs and the driving electrodes TEs may intersect with each other. Mutual capacitance $C_M$ may be formed between the driving electrode TE and the receiving electrode RE.

To improve touch sensing characteristics, for example, touch sensing sensitivity, a unit electrode of the sensing electrodes, for example, the driving electrodes TEs and/or the receiving electrodes REs, may have a specific shape, for example, a rhombus shape or pattern as illustrated in FIG. 2.

The touch controller 210 may include a driving circuit 211, a receiving circuit 212, a touch processor or controller 213, an encoder 215, and a decoder 216.

The driving circuit 211 may include a plurality of transmitters, for example, first to fourth transmitters TX1, TX2, TX3, and TX4. The first to fourth transmitters TX1 to TX4 may provide drive signals to the driving electrodes TEs. As described above with reference to FIG. 1, the transmitters TX1 to TX4, which may be all or some transmitters provided in the driving circuit 211, may simultaneously apply drive signals to the driving electrodes TEs corresponding thereto. In other words, a plurality of drive signals may be simultaneously applied to the driving electrodes TEs.

The encoder 215 may encode a reference signal, for example, a pulse signal having a certain frequency based on a matrix, for example, the Hadamard matrix, or a code. The encoder 215 may generate a plurality of drive signals based on the encoded reference signal. The drive signals may have the same phase in some periods and different phases in some other periods.

The receiving circuit 212 may include a plurality of receivers RXs, and the receivers RXs may receive a plurality of sensing signals from the receiving electrodes REs. Each of the receivers RXs may be connected to one corresponding receiving electrode RE to receive a sensing signal, or connected, in a time sharing manner, to at least two receiving electrodes RE to receive at least two sensing signals.

The sensing signal may indicate the mutual capacitance $C_M$ between the driving electrode TE to which a drive signal is applied and the receiving electrode RE, which receives a sensing signal. For example, when a touch occurs at one point on the touch panel 110, the mutual capacitance $C_M$ at the point may be decreased, and thus, the level of a sensing signal may be decreased or increased compared to the level before the generation of the touch.

The receivers RXs may generate sensing values by amplifying and analog-digital converting received sensing signals. The receivers RXs may generate a plurality of sensing values.

The decoder 216 may receive the sensing values from the receivers RXs, and may decode the received sensing values based on the matrix or code used by the encoder 215 to encode the reference signal. For example, the decoder 216 may generate touch values by multiplying sensing values by an inverse matrix to the matrix. The touch value may indicate each of a plurality of mutual capacitances between the driving electrodes TEs to which the drive signals are applied and the receiving electrodes REs.

In an example embodiment, the touch panel 110 may include dot sensing electrodes, each of which operates as both the driving electrode and the sensing electrode. The dot sensing electrodes may be arranged in a matrix, and each of the dot sensing electrodes may be referred to as a dot sensor. The transmitters TXs and the receivers RXs may be integrally implemented to respectively provide the drive signals to and receive the sensing signals from a plurality of dot sensors.

The touch processor 213 may control an overall operation of the touch controller 210, for example, operation timings of the driving circuit 211 and the receiving circuit 212. Furthermore, the touch processor 213 may identify a touch, touch generation position and touch strength (pressure), and the like, based on the touch values received from the decoder 216. The touch processor 213 may further provide touch sensing timing information, for example, the touch clock signal $CLK_T$ of FIG. 1, to the driving circuit 200.

The display panel 120 may include a display layer 121 and a common electrode 122, and the display layer 121 may be formed on a substrate of the display panel 120 and the common electrode 122 may be formed above the display layer 121. The display layer 121 may include a plurality of gate lines or scan lines GLs and a plurality of source lines or data lines SLs, and the gate lines GLs may extend in the first direction, for example, the X-axis direction, and the source lines SLs may extend in the second direction, for example, the Y-axis direction. A plurality of pixels may be formed at a plurality of points where the source lines SLs and the gate lines GLs intersect with each other.

A common voltage may be applied to the common electrode 122, and the common voltage may be a voltage of a certain level, for example, a ground voltage.

The DDI 220 may include a timing controller 221, a source driver 222, and a gate driver 223.

The timing controller 221 may control the operations of the source driver 222 and the gate driver 223, for example, providing a timing signal indicating operation timing or a control signal to the source driver 222 and the gate driver 223. Furthermore, the timing controller 221 may receive the image data IDT from the host 300 of FIG. 1, process the image data IDT by performing, for example, image quality processing, data format changing according to the pixel structure of the display panel 120 structure, and the like, and provide the image data IDT that is processed, in units of lines, to the source driver 222. Furthermore, the timing controller 221 may provide a signal indicating display timing, for example, the vertical synchronous signal Vsync, to the touch controller 210. The vertical synchronous signal Vsync may indicate a frame period during which an image is updated in the display panel 120 or a period during which no image is updated, for example, the blank period or a porch period.

The gate driver 223 may include a plurality of buffers BFs, and each of the buffers BFs may provide gate signals of an active level to the gate lines GLs of the display panel 120. For example, the gate driver 223 may sequentially provide the gate signals of an active level to the gate lines GLs so that the gate lines GLs are sequentially driven.

The source driver 222 may include a plurality of source amplifiers SAs or channel amplifiers, and the source amplifiers SAs may provide image signals, for example, a source voltage Vsrc, to the source lines SLs of the display panel 120. The source amplifiers SAs may provide image signals to corresponding ones of the source lines SLs, and the source amplifiers SAs may simultaneously provide image signals to the source lines SLs. In an example embodiment, the source amplifiers SAs may provide, in a time sharing manner, image signals to two or more source lines SLs.

When a gate signal of an active level is applied to a corresponding gate line GL, each of the pixels connected between the gate lines GLs and the source lines SLs may output an optical signal based on an image signal, for example, a grayscale voltage, received through a corresponding source line SL. Accordingly, an image may be displayed on the display panel 120.

Figure 3:
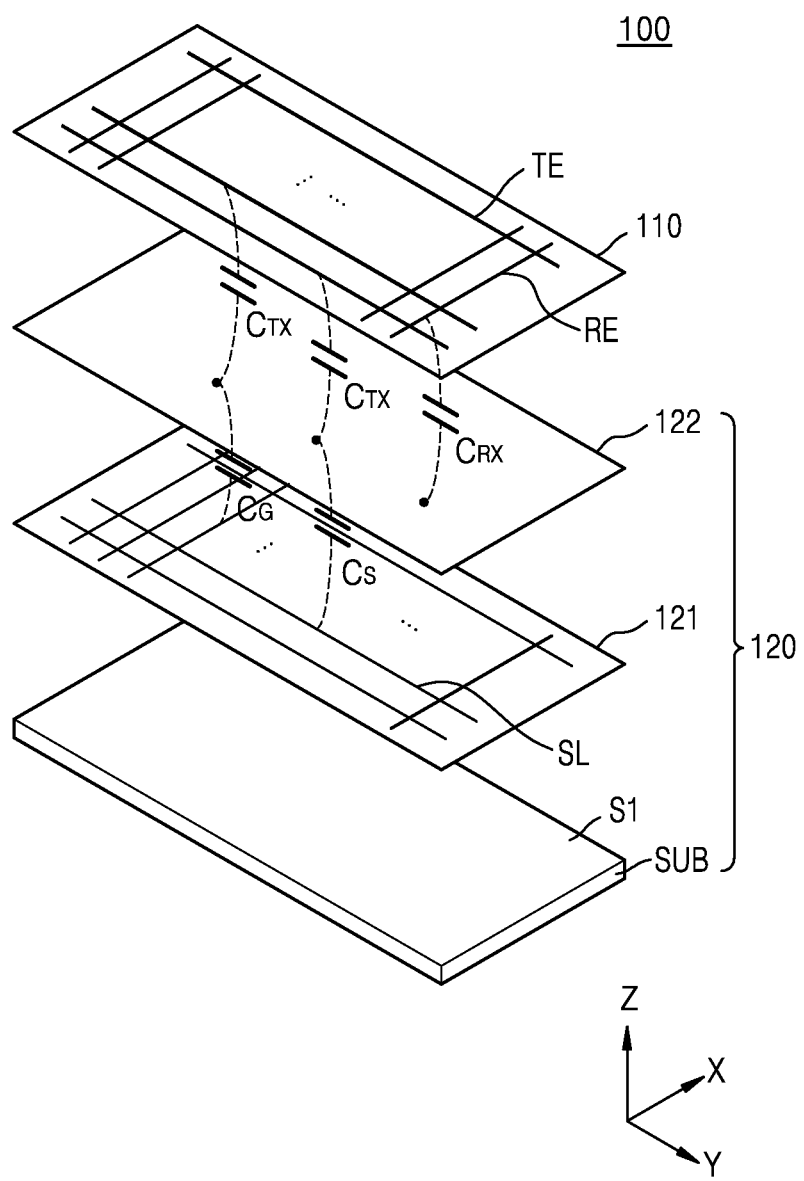
FIG. 3 is a view of layers of the touch screen of FIG. 1.

FIG. 3 is a view of layers of the touch screen 100 of FIG. 1.

Referring to FIG. 3, the touch screen 100 may include a substrate SUB, the display layer 121, the common electrode 122, and the touch panel 110 or the touch sensor array. However, example embodiments are not limited thereto, and the touch screen 100 may further include one or more additional layers provided between the above-described components. Furthermore, the touch screen 100 may further include top glass arranged on the touch panel 110.

The substrate SUB may include a first surface 51 which extends in the first direction, for example, the X-axis direction, and the second direction, for example, the Y-axis direction. The display layer 121, the common electrode 122, and the touch panel 110 may be stacked in a third direction, for example, a Z-axis direction, perpendicular to the first surface 51 of the substrate SUB. As illustrated in the drawings, the common electrode 122 may be provided between the display layer 121 and the touch panel 110.

Parasitic capacitances, for example, $C_{TX}$ and $C_{RX}$, may be formed between a plurality of electrodes of the touch panel 110, for example, the driving electrode TE and the receiving electrode RE, and the common electrode 122, and parasitic capacitances, for example, $C_S$ and $C_G$, may be formed between the source line SL and the gate line GL of the display layer 121 and the common electrode 122.

As the common electrode 122 may be arranged above the display layer 121, and may have a thin thickness to allow light emitted from the pixel to transmit therethrough, it may be difficult to sufficiently lower a resistance value of the common electrode 122. When the electric potential of the electrodes adjacent to the common electrode 122, for example, the driving electrode TE, the source line SL, or the gate line GL, is toggled, a noise component according thereto may flow into the common electrode 122, and the noise component may not be quickly emitted by an RC delay of the common electrode 122, so that the voltage level of the common electrode 122 may vary. In other words, noise may be generated in the voltage level of the common electrode 122. Part of the noise generated in the voltage level of the common electrode 122 may flow into the electrode of the touch panel 110, for example, the receiving electrode RE or the driving electrode TE.

Recently, in various mobile devices such as smartphones or foldable phones, to expand a display form factor or battery space, the thickness of the display panel 120 has gradually decreased, and the size of the touch screen 100 including the display panel 120 has gradually increased. As the distance between the display panel 120 and the touch panel 110 decreases, the parasitic capacitances, for example, $C_S$, $C_{TX}$, $C_{RX}$, and $C_G$, between the electrodes of the two panels may increase.

In the unbalanced driving period during which a plurality of drive signals having the same phase are applied to the driving electrodes, due to the parasitic capacitance between the driving electrodes and the common electrode, the voltage level of the common electrode 122 of the display panel 120 may fluctuate, instead of being maintained constant. For example, noise due to a plurality of drive signals may flow into the common electrode 122. When the display panel 120 is driven, that is, an image is updated, while the voltage level of the common electrode fluctuates, the quality of the image may deteriorate. Furthermore, as the noise of the common electrode 122 may flow into the electrodes of the touch panel 110, for example, the receiving electrode RE, the touch sensing sensitivity may deteriorate.

However, as described above with reference to FIG. 1, according to the method of driving the touch screen 100, that is, the method of operating the driving circuit 200, of the touch screen device 1000 according to an example embodiment, the unbalanced driving may be performed in the period during which the touch controller 210 does not update an image in the display panel 120, for example, the blank period. In this state, as the DDI 220 applies a plurality of compensation signals having the same frequency as and a phase opposite to a plurality of drive signals, to at least some of a plurality of source lines of the display panel. Thus, the fluctuation of the voltage level of the common electrode, that is, the infiltration of noise to the common electrode, may be prevented. As the voltage level of the electrode may be maintained constant, the touch sensing sensitivity may be improved.

Figure 4A:
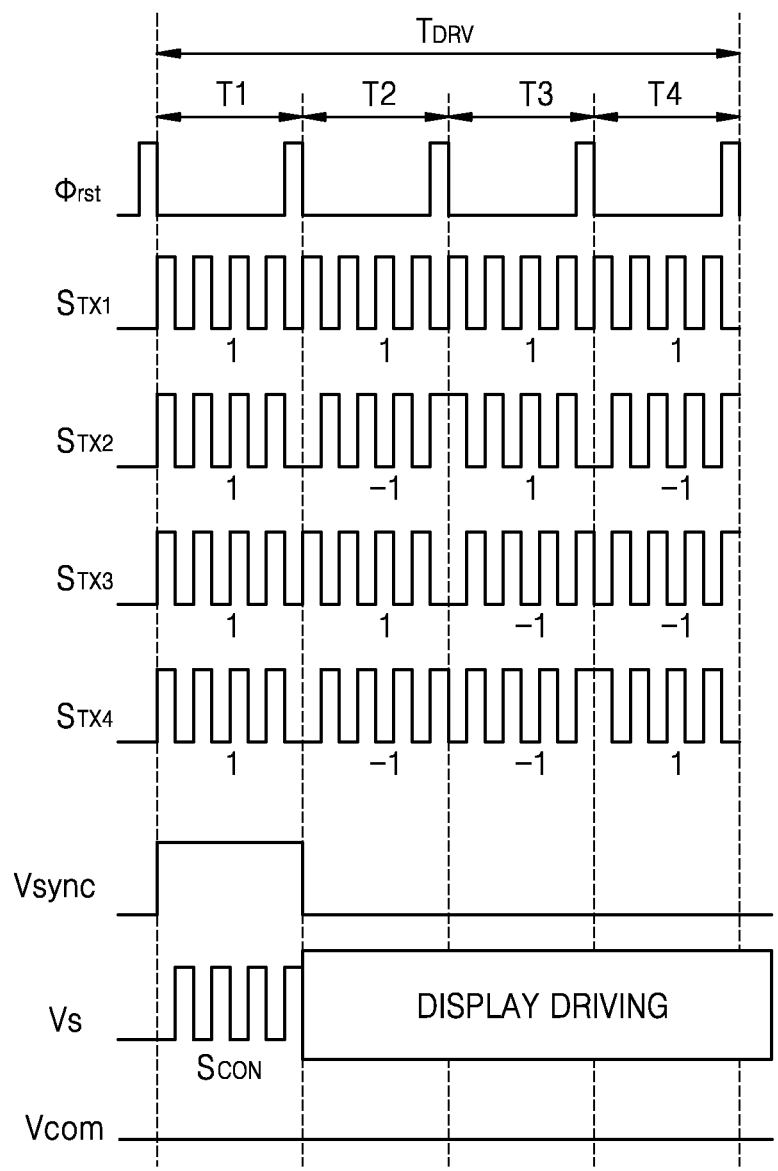
FIGS. 4A and 4B are timing diagrams of a method of driving a touch screen according to an example embodiment.
Figure 4B:
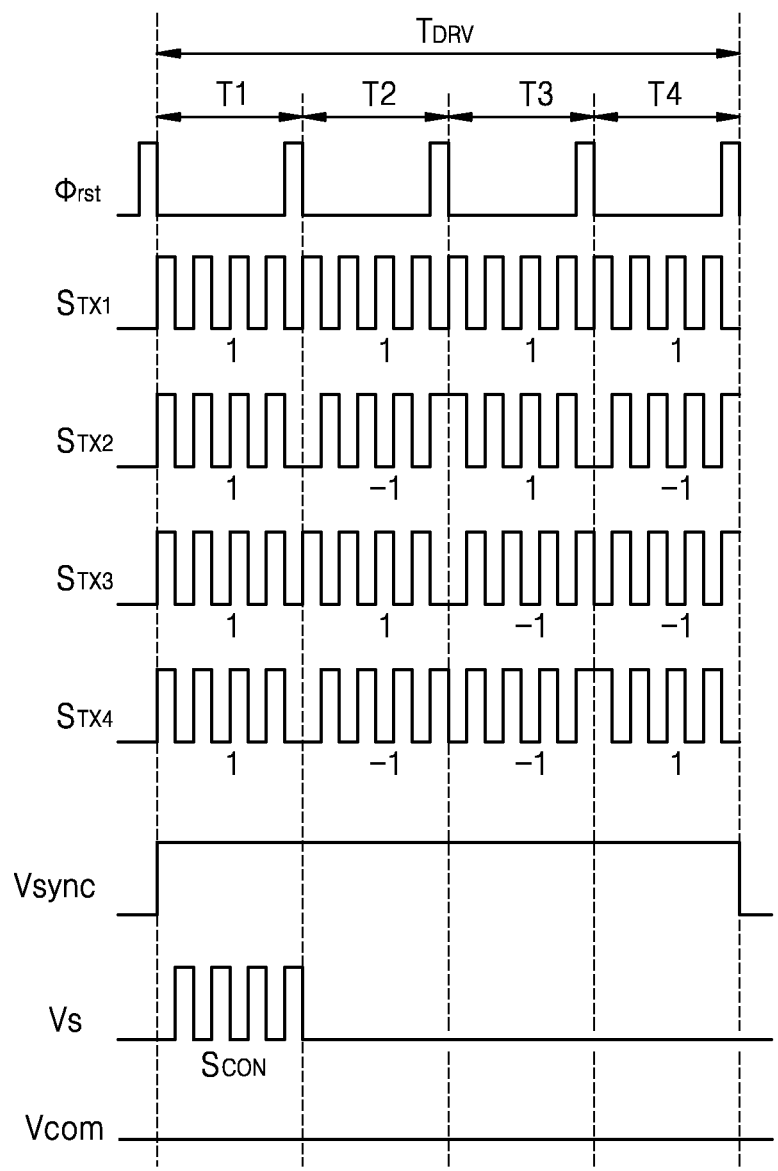
Figure 5:
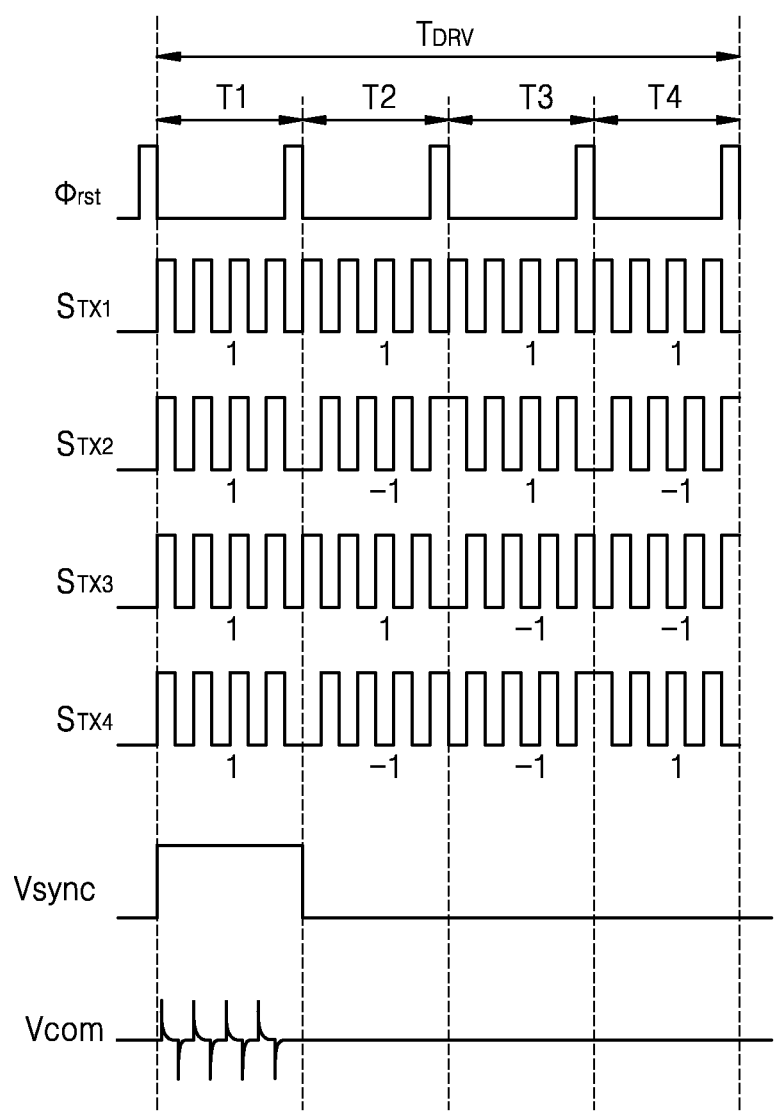
FIG. 5 is a timing diagram of a method of driving a touch screen according to a comparative example.

FIGS. 4A and 4B are timing diagrams of a method of driving a touch screen according to an example embodiment. FIG. 5 is a timing diagram of a method of driving a touch screen according to a comparative example. For convenience of explanation, FIG. 2 is also referred to in the description below.

Referring to FIGS. 2 and 4A, the driving circuit 211 of the touch controller 210 may provide the driving electrodes TEs with a plurality of drive signals. For example, each of the first to fourth transmitters TX1 to TX4 of the driving circuit 211 may apply the first to fourth drive signals $S_{TX1}$ to $S_{TX4}$ encoded based on the Hadamard matrix to four driving electrodes TE of the touch panel 110 in a driving period $T_{DRV}$. The driving period $T_{DRV}$ may be divided into first to fourth periods T1 to T4 or first to fourth sub-periods based on a reset signal ϕrst.

The first to fourth drive signals $S_{TX1}$ to $S_{TX4}$ each may include a first pulse signal expressed by "1" and/or a second pulse signal expressed by "−1". The phase of the first pulse signal and the phase of the second pulse signal may be opposite to each other. The first pulse signal may be referred to as the pulse signal of positive polarization, and the second pulse signal may be referred to as the pulse signal of negative polarization.

In the first period T1, all of the first to fourth drive signals $S_{TX1}$ to $S_{TX4}$ may include the first pulse signal. In the second period T2, the first and third drive signals $S_{TX1}$ and $S_{TX3}$ each may include the first pulse signal, and the second and fourth drive signals $S_{TX2}$ and $S_{TX4}$ each may include the second pulse signal. In the third period T3, the first and second drive signals $S_{TX1}$ and $S_{TX2}$ each may include the first pulse signal, and the third and fourth drive signals $S_{TX3}$ and $S_{TX4}$ each may include the second pulse signal. In the fourth period T4, the first and fourth drive signals $S_{TX1}$ and $S_{TX4}$ each may include the first pulse signal, and the second and third drive signals $S_{TX2}$ and $S_{TX3}$ each may include the second pulse signal.

The first period T1 may be included in a period during which display is not performed, for example, the blank period or the porch period. Display not being performed may mean that image update is not performed in the display panel 120. As illustrated in FIG. 4A, a period in which the vertical synchronous signal Vsync is logic high may indicate the blank period, and a period in which the vertical synchronous signal Vsync is logic low may indicate a display period or a display driving period. The first period T1 may be included in the period in which the vertical synchronous signal Vsync is logic high.

In the blank period, the gate driver 223 of the DDI 220 may not be operated. However, as illustrated in FIG. 4A, in the first period T1 that is included in the blank period, the source driver 222 may apply a compensation signal $S_{CON}$ as a source voltage Vs to at least one of the source lines SLs of the display panel 120. The compensation signal $S_{CON}$ may have the same frequency as and a phase opposite to the first pulse signal. For example, when first to fourth drive signals $S_{TX1}$ to $S_{TX4}$ include the first pulse signal during the first period T1, the compensation signal $S_{CON}$ may include the second pulse signal during the first period T1.

Display driving may be performed after the blank period, for example, in the second to fourth periods T2 to T4. The source driver 222 may output the source voltage Vs, for example, a grayscale voltage, for display driving to the source lines SLs, and the gate driver 223 may operate.

The number of first pulse signals and the number of second pulse signals, which are output as the first to fourth drive signals $S_{TX1}$ to $S_{TX4}$ in the second to fourth periods T2 to T4, are the same. Accordingly, in the second to fourth periods T2 to T4, the sum of phases of the first to fourth drive signals $S_{TX1}$ to $S_{TX4}$ may be "0". The effects of the first to fourth drive signals $S_{TX1}$ to $S_{TX4}$ on the common electrode 122 of FIG. 2 may offset each other, and thus, a voltage Vcom of the common electrode 122 may be maintained constant.

In the first period T1, all of the first to fourth drive signals $S_{TX1}$ to $S_{TX4}$ may include the first pulse signal, and the sum of phases of the first to fourth drive signals $S_{TX1}$ to $S_{TX4}$ may be greater than or less than "0".

According to the method of driving a touch screen according to the comparative example of FIG. 5, in the first period T1, the source driver 222 and the gate driver 223 of the DDI 220 may not be operated. Thus, the compensation signal $S_{CON}$ is not applied to the source line SL in the first period T1. In the first period T1, all of the first to fourth drive signals $S_{TX1}$ to $S_{TX4}$ may include the first pulse signal.

Accordingly, the first pulse signals may overlap each other, and the overlapped signals may affect the common electrode 122. As illustrated in the drawings, when the first to fourth drive signals $S_{TX1}$ to $S_{TX4}$ are toggled, noise, for example, glitch noise, may be generated in the voltage Vcom of the common electrode 122.

However, according to the method of driving a touch screen according to an example embodiment of FIG. 4A, in the first period T1, the compensation signal $S_{CON}$ having a phase opposite to the first pulse signal is applied to at least one source line SL. Thus, the effect of the first to fourth drive signals $S_{TX1}$ to $S_{TX4}$ on the common electrode 122 and the effects of the compensation signal $S_{CON}$ on the common electrode 122 may offset each other. Accordingly, in the first period T1, the voltage Vcom of the common electrode 122 may be maintained constant.

Although FIG. 4A illustrates that the first period T1 is included in the blank period and the second to fourth periods T2 to T4 are included in the display driving period, example embodiments are not limited thereto. As illustrated in FIG. 4B, the second to fourth periods T2 to T4 may also be included in the blank period, that is, a period in which display driving is not performed. However, the compensation signal $S_{CON}$ may be applied to at least one source line SL in the first period T1, and in the second to fourth periods T2 to T4, the compensation signal $S_{CON}$ is not applied to the source line SL. In the second to fourth periods T2 to T4, the source driver 222 may not be operated.

Figure 6A:
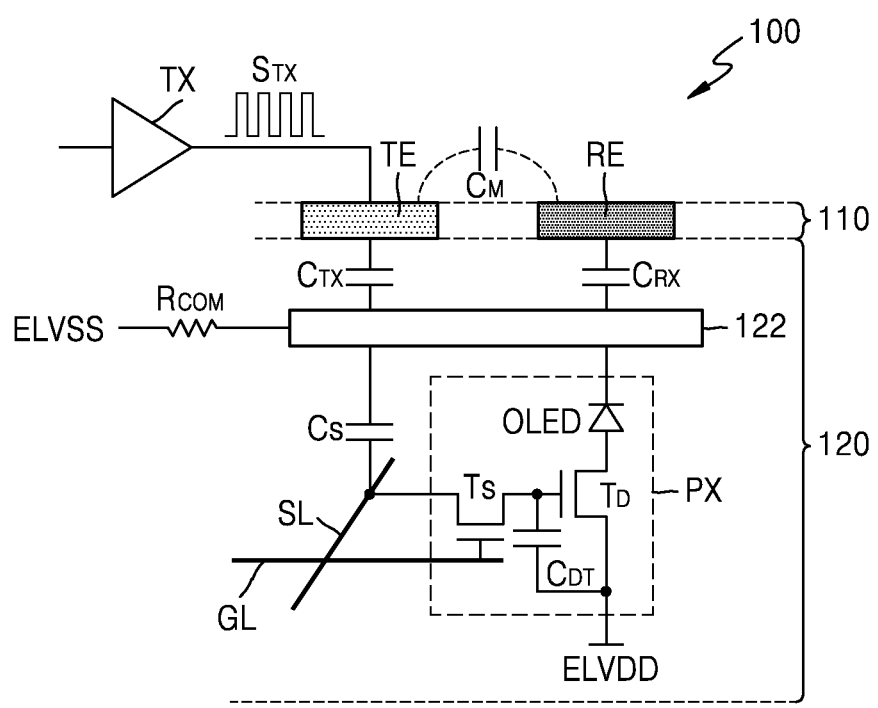
FIGS. 6A and 6B are views of a parasitic component formed in a touch screen, which affects touch sensing.
Figure 6B:
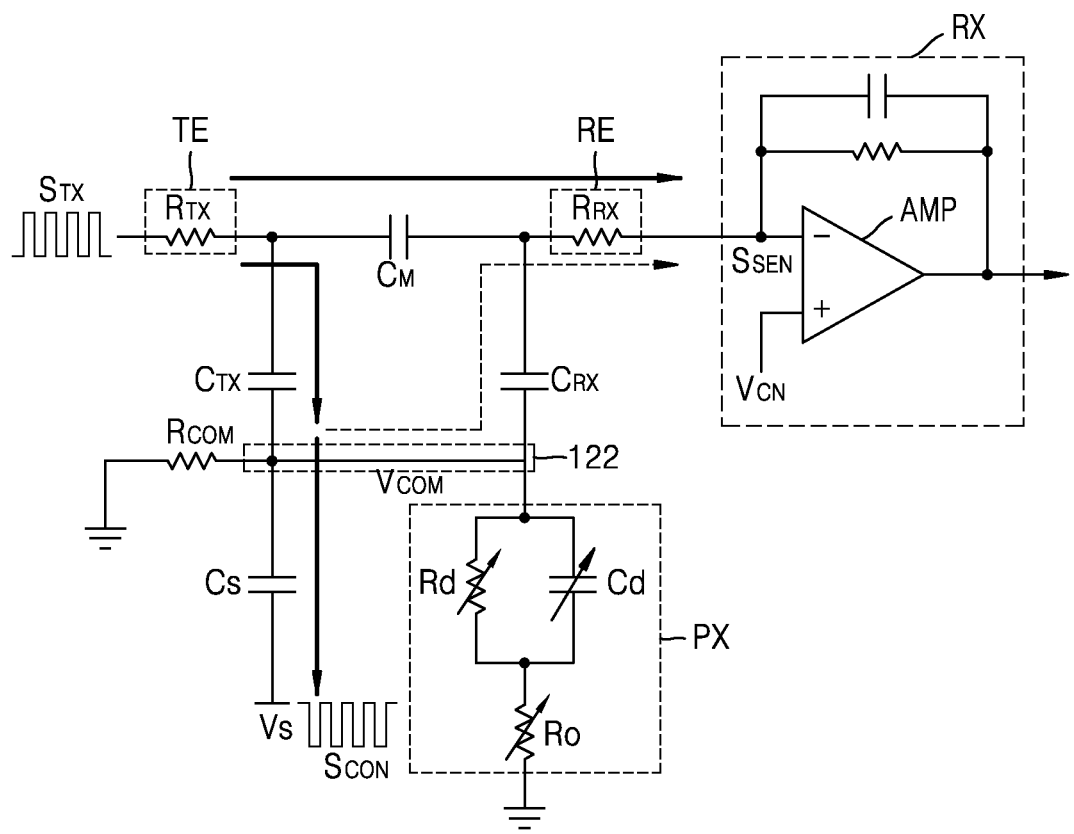

FIGS. 6A and 6B are views of a parasitic component formed in a touch screen, which affects touch sensing.

Referring to FIG. 6A, the mutual capacitance $C_M$ may be formed between the driving electrode TE and the receiving electrode RE of the touch panel 110. The parasitic capacitances $C_{TX}$ and $C_{RX}$ may be formed between the common electrode 122 of the display panel 120 and the driving electrode TE and the receiving electrode RE. The parasitic capacitance $C_S$ may be formed between the common electrode 122 and the source line SL.

The pixel PX may include a select transistor $T_S$, a driving transistor $T_D$, a data capacitor $C_{DT}$, and an organic light-emitting diode (OLED). One end of the select transistor $T_S$ may be connected to the source line SL, and the other end thereof may be connected to a gate terminal of the driving transistor $T_D$. A gate terminal of the select transistor $T_S$ may be connected to the gate line GL.

A first power voltage ELVDD may be applied to one end of the driving transistor $T_D$, and the other end of the driving transistor $T_D$ may be connected to an anode of the OLED. The data capacitor $C_{DT}$ may be connected to the one end and the gate terminal of the driving transistor $T_D$. The cathode of the OLED may be connected to the common electrode 122, and a second power voltage ELVSS may be applied to the common electrode 122. For example, the voltage level of the second power voltage ELVSS may be lower than that of the first power voltage ELVDD, for example, the second power voltage ELVSS may be a ground voltage. The common electrode 122 may include a resistance component, for example, a parasitic resistor $R_{COM}$.

FIG. 6B is an equivalent model of the touch screen 100 of FIG. 6A.

Referring to FIG. 6B, the driving electrode TE and the receiving electrode RE may be modeled into parasitic resistor $R_{TX}$ and $R_{RX}$, respectively. The pixel PX may be modeled into a parallel connection structure of a variable resistor Rd and a variable capacitor Cd and an output resistance Ro connected thereto. The variable resistor Rd and the variable capacitor Cd may vary according to an amount of current flowing in the driving transistor $T_D$.

When the drive signal $S_{TX}$ is applied by a transmitter TX to the driving electrode TE, the sensing signal $S_{SEN}$ according to the drive signal $S_{TX}$ may be input to the receiver RX through the parasitic resistor $R_{TX}$, the mutual capacitor $C_M$, and the parasitic resistance $R_{RX}$. The receiver RX may be implemented by an integrator circuit including an amplifier AMP. The sensing signal $S_{SEN}$ may be input to one end (−) of the amplifier AMP, and a common voltage $V_{CN}$ for removing common noise may be applied to the other end (+) of the amplifier AMP.

By the parasitic capacitance $C_{TX}$ formed between the driving electrode TE and the common electrode 122, noise according to the drive signal $S_{TX}$ may flow into the common electrode 122. The noise may flow into the receiving electrode RE and interfere with the sensing signal $S_{SEN}$ due to the parasitic capacitor $C_{RX}$ formed between the receiving electrode RE and the common electrode 122 to be input to the receiver RX However, the compensation signal $S_{CON}$ may be applied to the source line SL, and due to the parasitic capacitance $C_S$ formed between the source line SL and the common electrode 122, noise according to the compensation signal $S_{CON}$ may flow into the common electrode 122. As the phases of the drive signal $S_{TX}$ and the compensation signal $S_{CON}$ are opposite to each other, the noise according to the drive signal $S_{TX}$ and the noise according to the compensation signal $S_{CON}$ may offset each other. Accordingly, the sensing signal $S_{SEN}$ may have a value indicating the mutual capacitance $C_M$ sensed based on the drive signal $S_{TX}$, and may not include the noise according to the drive signal $S_{TX}$ and the noise according to the compensation signal $S_{CON}$.

Figure 7A:
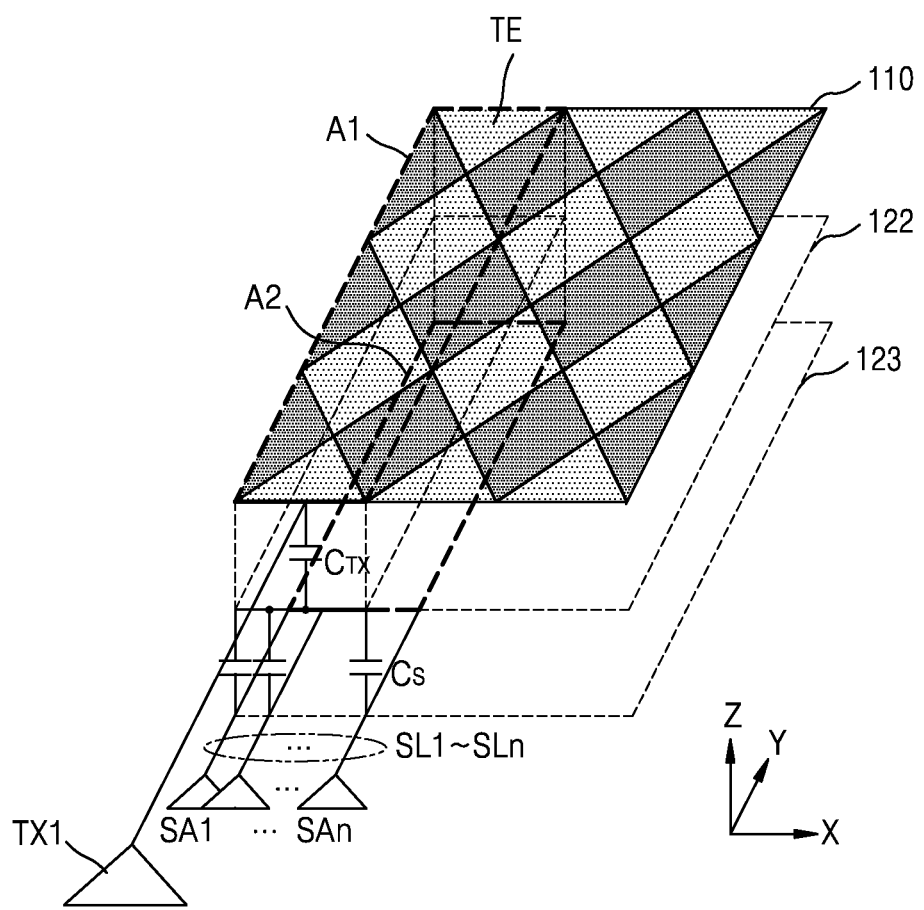
FIG. 7A is a view of a method of driving a touch screen device according to an example embodiment.
Figure 7B:
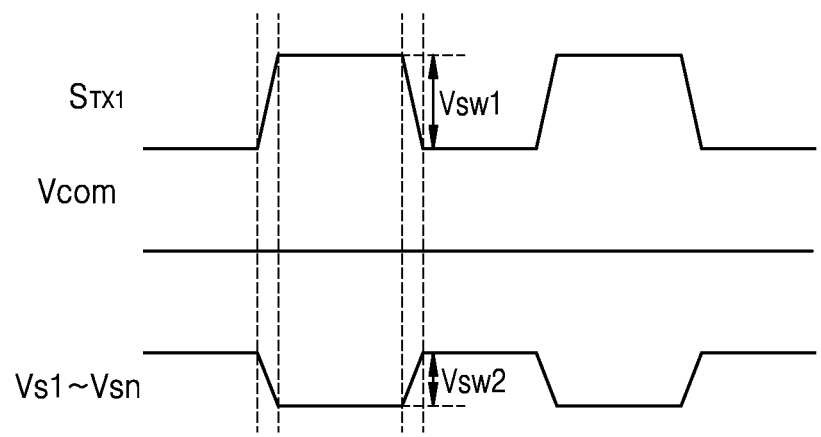
FIG. 7B is a waveform diagram of signals applied to a screen device according to an example embodiment.

FIG. 7A is a view of a method of driving a touch screen device according to an example embodiment. FIG. 7B is a waveform diagram of signals applied to a screen device according to an example embodiment.

In detail, FIG. 7A illustrates a source line driving method in an unbalanced driving period, and FIG. 7B illustrates a drive signal, a common electrode voltage, and a source voltage in the unbalanced driving period.

Referring to FIGS. 7A and 7B, in the touch panel 110, the driving electrodes TEs may be arranged in the first direction, for example, the X-axis direction, and may extend in the second direction, for example, the Y-axis direction. In the display panel 120, the source lines SLs may be arranged in the first direction and may extend in the second direction. The driving electrode TE and the source line SL may extend in the same direction. A pitch between the driving electrodes TEs, that is, a distance between the driving electrodes TE adjacent to each other, may be longer than a pitch between the source lines SLs. Accordingly, a plurality of source lines, for example, first to n-th source lines SL1 to SLn, where n is an integer greater than or equal to 2, may be arranged in a second area A2 on a display layer 123 corresponding to a first area A1 on the touch panel (touch sensor layer) 110 where one driving electrode TE is located. The first area A1 and the second area A2 may be areas that vertically overlap each other in the third direction, for example, the Z-axis direction.

In the unbalanced driving period, for example, the first period T1 of FIG. 4A of the driving period $T_{DRV}$, when the first transmitter TX1 applies the first drive signal $S_{TX1}$ to the driving electrode TE, first to n-th source amplifiers SA1 to SAn may apply the compensation signal $S_{CON}$ as first to n-th source voltages Vs1 to Vsn to the first to n-th source lines SL1 to SLn.

In the common electrode 122, Equation 1, below, is satisfied to offset the effect of mutual driving of the first drive signal $S_{TX1}$ and the compensation signal $S_{CON}$.

$$C_{TX} \times S_{TX1} = -n \times C_S \times S_{CON} \quad \text{[Equation 1]}$$

The first drive signal $S_{TX1}$ and the compensation signal $S_{CON}$ have opposite phases. According to Equation 1, the voltage level, or a swing width Vsw2, of the compensation signal $S_{CON}$ may be determined based on the capacitances $C_{TX}$ and $C_S$, the voltage level, or a swing width Vsw1, of the first drive signal $S_{TX1}$, and the number (n) of driven source lines.

For example, assuming that the capacitance $C_{TX}$ is about 450 picofarad (pF), the capacitance $C_S$ is 20 pF, one driving electrode is arranged in the first area A1, two hundred (200) of the source lines SL are arranged in the second area A2 corresponding to the first area A1, and the first drive signal $S_{TX1}$ swings at about 12 V, when the compensation signal $S_{CON}$ swings at about 1.35 V, the effect of the mutual driving of the first drive signal $S_{TX1}$ and the compensation signal $S_{CON}$ on the common electrode 122 may be offset, and thus, the voltage Vcom of the common electrode 122 may be maintained constant.

Figure 8A:
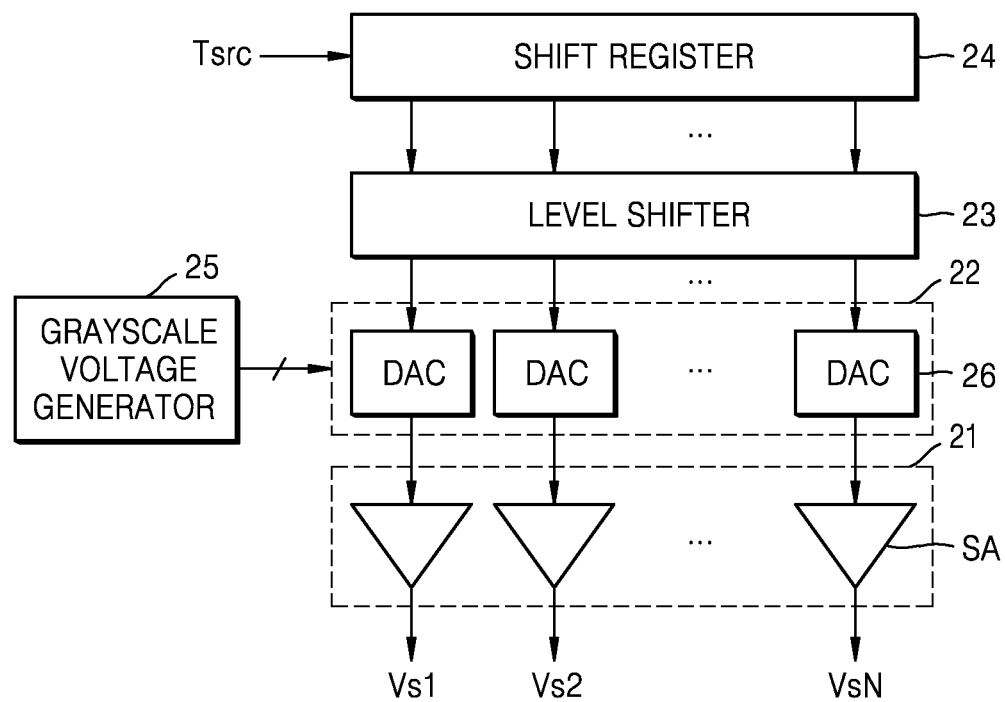
FIG. 8A is a schematic block diagram of a source driver according to an example embodiment.
Figure 8B:
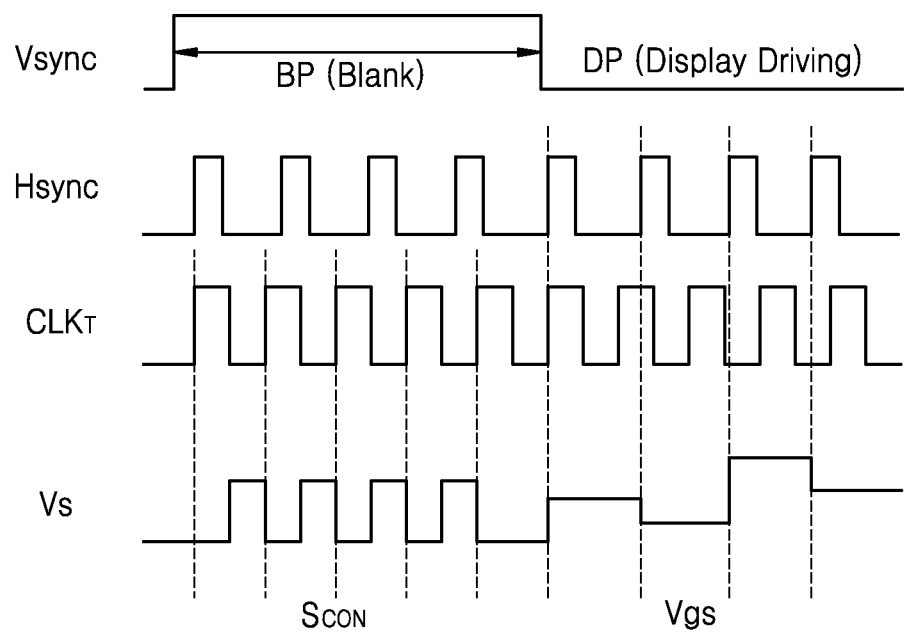
FIG. 8B is a timing diagram of signals used in the source driver in a blank period and a display driving period of FIG. 8B according to an example embodiment.

FIG. 8A is a schematic block diagram of a source driver according to an example embodiment. FIG. 8B is a timing diagram of signals used in the source driver in a blank period and the display driving period of FIG. 8B.

Referring to FIG. 8A, the source driver 222 may include an output stage 21, a digital-to-analog conversion (DAC) block 22, a level shifter 23, a shift register 24, and a grayscale voltage generator 25.

The shift register 24 may store pixel signals (pixel data) corresponding to pixels of the display panel 120 of FIG. 2, and in response to a source timing signal Tsrc, for example, Horizontal synchronous signal Hsync, the shift register 24 may output the pixel signals. The level shifter 23 may change the levels of pixel signals to levels that may be used in the DAC block 22. The grayscale voltage generator 25 may generate a plurality of grayscale voltages according to a resolution indicated by the pixel signal. For example, when the pixel signal is 8-bit data, the grayscale voltage generator 25 may generate $2^8$, that is, two hundred and fifty-six (256), grayscale voltages. The plurality of grayscale voltages may be provided to the DAC block 22.

The DAC block 22 may include a plurality of digital-analog converters (DACs) 26, and each of the DACs 26 may convert the pixel signal received from the level shifter 23 to a corresponding grayscale voltage. The DACs 26 may select and output a grayscale voltage corresponding to the pixel signal from among the grayscale voltages, thereby converting the pixel signal to a corresponding grayscale voltage. Accordingly, the pixel signal that is a digital signal may be converted to the grayscale voltage that is an analog signal.

The output stage 21 may include a plurality of sense amplifiers SAs, each of the sense amplifiers SAs may receive grayscale voltages from the DAC 26 corresponding thereto, and buffer the grayscale voltage, for example, current amplification, to be output as a source voltage. The sense amplifiers SAs may output a plurality of source voltages to a plurality of source lines. For example, the plurality of sense amplifiers SAs may include N source amplifiers, where N is an integer greater than or equal to two. The N source amplifiers SA may output first to N-th source voltage Vs1 to VsN to the N-number of source lines SLs.

Referring to FIG. 8B, in the display driving period DP, the Horizontal synchronous signal Hsync is used as the source timing signal Tsrc, and the shift register 24, in response to the horizontal synchronous signal Hsync, may output the stored pixel signal. The Horizontal synchronous signal Hsync may indicate a period in which one row of the display panel 120 of FIG. 1 is driven. As the pixel signals corresponding to the respective row are output in response to the horizontal synchronous signal Hsync, the grayscale voltages Vgs corresponding to the pixel signals may be synchronized with the horizontal synchronous signal Hsync and output to the source lines.

In the blank period BP, the touch clock signal $CLK_T$ received from the touch controller 210 of FIG. 1 may be used as the source timing signal Tsrc. In an example embodiment, when the touch clock signal $CLK_T$ is a high level or is shifted from a low level to a high level, the shift register 24 may output a signal indicating a low level of the compensation signal $S_{CON}$, and when the touch clock signal $CLK_T$ is a low level or is shifted from a high level to a low level, the shift register 24 may output a signal indicating a high level of the compensation signal $S_{CON}$. Accordingly, the grayscale voltages corresponding to signals indicating a high level or low level of the compensation signal $S_{CON}$ may be output to at least some of a plurality of source lines, for example, the first to N-th source lines SL1 to SLn, and as a first grayscale voltage indicating a high level and a second grayscale voltage indicating a low level are alternately output in response to the source timing signal Tsrc, the compensation signal $S_{CON}$ including the first grayscale voltage and the second grayscale voltage may be provided to at least one source line.

Figure 9:
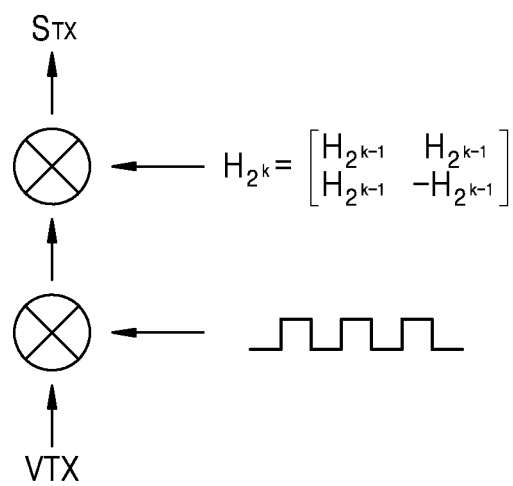
FIG. 9 is a view of an encoding operation of a touch controller according to an example embodiment, in which the operation of FIG. 9 may be performed by an encoder of FIG. 2.

FIG. 9 is a view of an encoding operation of a touch controller according to an example embodiment. The operation of FIG. 9 may be performed in the encoder 215 of FIG. 2.

Referring to FIG. 9, the encoder 215 may perform pulse modulation on a transmitting voltage VTX. The transmitting voltage VTX may be a DC voltage. As a result of the pulse modulation, a pulse signal having a certain amplitude of the transmitting voltage VTX and frequency of the pulse signal may be generated.

The encoder 215 may encode a plurality of pulse signals based on a matrix. As a result of the encoding, the encoder 215 may generate a plurality of drive signals $S_{TX}$ that are multi-signal to be output as a plurality of signals according to the size of rows or columns in a matrix.

In an example embodiment, the encoder 215 may perform encoding based on the Hadamard matrix or the Hadamard code. The encoder 215 may encode or modulate a plurality of pulse signals based on a matrix $H_{2^k}$.

The Hadamard matrix is a square matrix in which all elements forming the matrix have a value of "1" or "−1", and two column vectors in the matrix are orthogonal to each other. The Hadamard matrix is the same as an inverse matrix thereof.

The Hadamard matrix $H_{2^k}$ has the Hadamard matrix $H_{2^{k-1}}$ as an element in first row and first column, one first and second column, and second row and first column, and the Hadamard matrix $-H_{2^{k-1}}$ as in element in second row and second column. $H_{2^k}$, $H_1$, $H_2$, $H_4$, and $H_8$ may be easily produced according to the principle of the Hadamard matrices. For example, the Hadamard matrices $H_4$ and $H_8$ may be expressed by Equations 2 and 3.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 2]}$$

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$ [Equation 3]

The Hadamard matrix H is characteristic in that, in all rows and columns except the first column or the first row, the sum of elements in each row or the sum of elements in each column is zero.

The drive signals $S_{TX}$ generated by using the Hadamard matrix H may cause noise of a high level as the voltages of the drive signals $S_{TX}$ are reinforced at a point corresponding to any one column, for example, the first column. Similarly, the voltage of the drive signals $S_{TX}$ are offset each other at other points except a point corresponding to the first column of the drive signals $S_{TX}$ generated by using the Hadamard matrix H, the level of noise may be reduced.

Although the Hadamard matrix H can be used for encoding, example embodiments are not limited thereto. The Hadamard matrix H is employed as a representative example of a matrix in which the sum of elements of each row or the sum of elements of each column is "0", and thus various matrices having the characteristics close to the above feature may be used for encoding.

Figure 10:
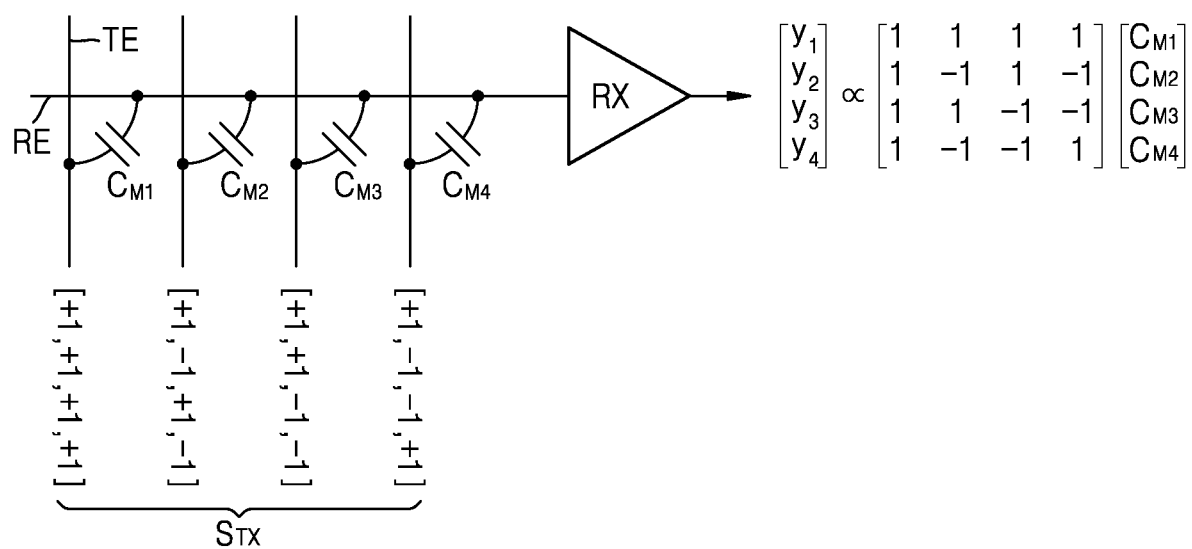
FIG. 10 is a view of a decoding operation of a touch controller according to an example embodiment.

FIG. 10 is a view of a decoding operation of a touch controller according to an example embodiment. The operation of FIG. 10 may be performed in the decoder 216 of FIG. 2.

Referring to FIG. 10, first to fourth mutual capacitances $C_{M1}$, $C_{M2}$, $C_{M3}$, and $C_{M4}$ may be formed between four driving electrodes TEs and one receiving electrode RE.

The same drive signals $S_{TX}$ may be applied through the four driving electrodes TEs. The drive signals $S_{TX}$ may be encoded based on the Hadamard matrix $H_4$. For example, in the first period T1 of FIG. 2, the drive signals $S_{TX}$ each having a pulse signal corresponding to "1" may be applied to the four driving electrodes TEs, in the second period T2 of FIG. 2, the drive signals $S_{TX}$ having pulse signals respectively corresponding to "1", "−1", "1", and "−1" may be applied to the four driving electrodes TEs, in the third period T3 of FIG. 2, the drive signals $S_{TX}$ having pulse signals respectively corresponding to "1", "1", "−1", and "−1" may be applied to the four driving electrodes TEs, and in the fourth period T3 of FIG. 2, the drive signals $S_{TX}$ having pulse signals respectively corresponding to "1", "−1", "−1", and "1" may be applied to the four driving electrodes TEs.

The receivers RXs may receive sensing signals generated according to a change in the mutual capacitance caused due to a touch. For example, in the first period T1, the element value of the received sensing signal is y1, in the second period T2, the element value of the received sensing signal is y2, in the third period T3, the element value of the received sensing signal is y3, and in the fourth period T4, the element value of the received sensing signal is y4.

An inverse matrix $H_4^{-1}$ of the Hadamard matrix $H_4$ used to encode the drive signals $S_{TX}$ may be used.

For example, elements [y1, y2, y3, y4] of the sensing signal may be proportional to a matrix multiplication of the Hadamard matrix $H_4$ and the first to fourth mutual capacitances $C_{M1}$, $C_{M2}$, $C_{M3}$, and $C_{M4}$. The first to fourth mutual capacitances $C_{M1}$, $C_{M2}$, $C_{M3}$, and $C_{M4}$ may be calculated based on a result of the multiplication of a matrix indicating the sensing signal by the inverse matrix of the Hadamard matrix $H_4$.

Figure 11:
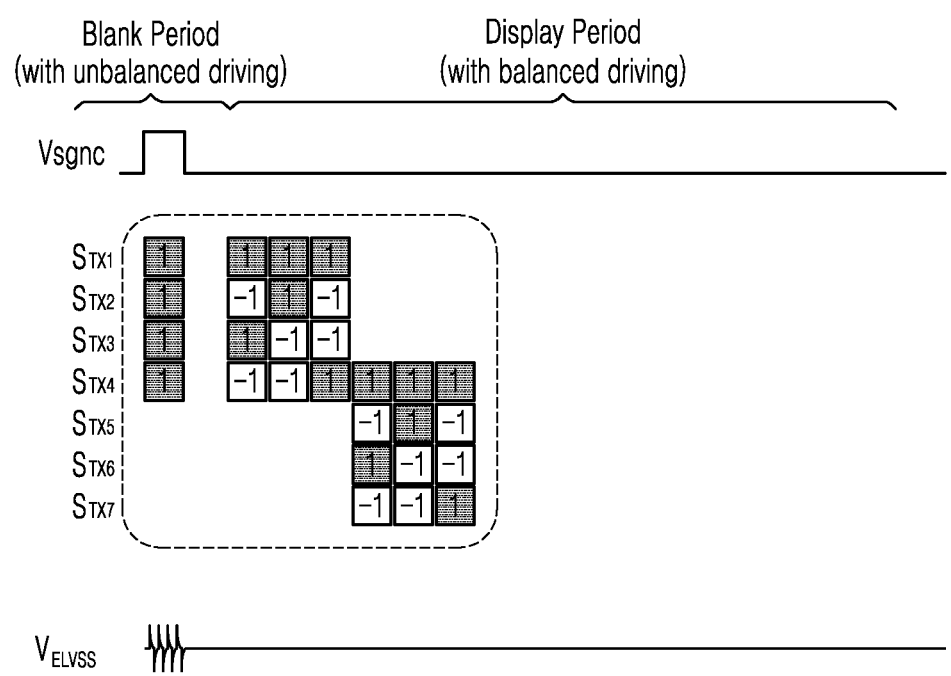
FIG. 11 is a timing diagram showing that some of drive signals that are encoded based on the Hadamard matrix overlap and are output, according to an example embodiment.

FIG. 11 is a timing diagram showing that some of drive signals that are encoded based on the Hadamard matrix overlap and are output, according to an example embodiment.

When the number of driving electrodes included in the touch panel 110 of FIG. 1 is not the power of two, the Hadamard matrix $H_{2^k}$ that is a square matrix and in which the number of rows and columns is $2^k$ cannot be used as it is.

According to an example embodiment, when the number of driving electrodes is greater than two to the K power and less than two to the K+1 power, where K is a natural number, the encoder 215 of FIG. 2 may encode the drive signals Six based on a matrix generated by partially overlapping a first Hadamard sub matrix having two to the K power number of rows and columns with a second Hadamard sub matrix.

For example, when the number of driving electrodes wired to the touch panel 110 is seven, as the power of two that is the largest and less than seven is four, a 4×4 Hadamard matrix $H_4$ may be used.

In an example embodiment, when the number of driving electrodes is seven, the Hadamard matrix $H_4$ may cover some ($S_{TX1}$ to $S_{TX4}$) of the drive signals $S_{TX1}$ to $S_{TX7}$. Other drive signals $S_{TX5}$ to $S_{TX7}$ that are not covered among the drive signals $S_{TX1}$ to $S_{TX7}$ may be generated based on other columns except the first column of the Hadamard matrix $H_{2^k}$. Two Hadamard matrices $H_4$ are overlapped by using the same Hadamard matrix $H_4$ so that only one first element "1" is overlapped, and accordingly, the drive signals $S_{TX4}$ to $S_{TX7}$ may be generated based on the generated matrix. The fourth drive signal $S_{TX4}$ may be applied twice, and capacitance values sensed by the fourth drive signal $S_{TX4}$ that is first applied may be used to calculate capacitance sensed by the drive signals $S_{TX5}$ to $S_{TX7}$.

As such, unbalanced driving may be performed in the blank period, and balanced driving may be performed in the other periods, for example, in the display period.

When the number of driving electrodes for generating drive signals by using the Hadamard matrix $H_{2^k}$ is greater than $2^k$, similar to the above description, $2^k$ drive signals may be generated by using the Hadamard matrix $H_{2^k}$ and the other drive signals may be generated based on the other columns except the first column of the Hadamard matrix $H_{2^k}$. Unbalanced driving may be performed in the blank period, and balanced driving may be performed in the other period.

Figure 12:
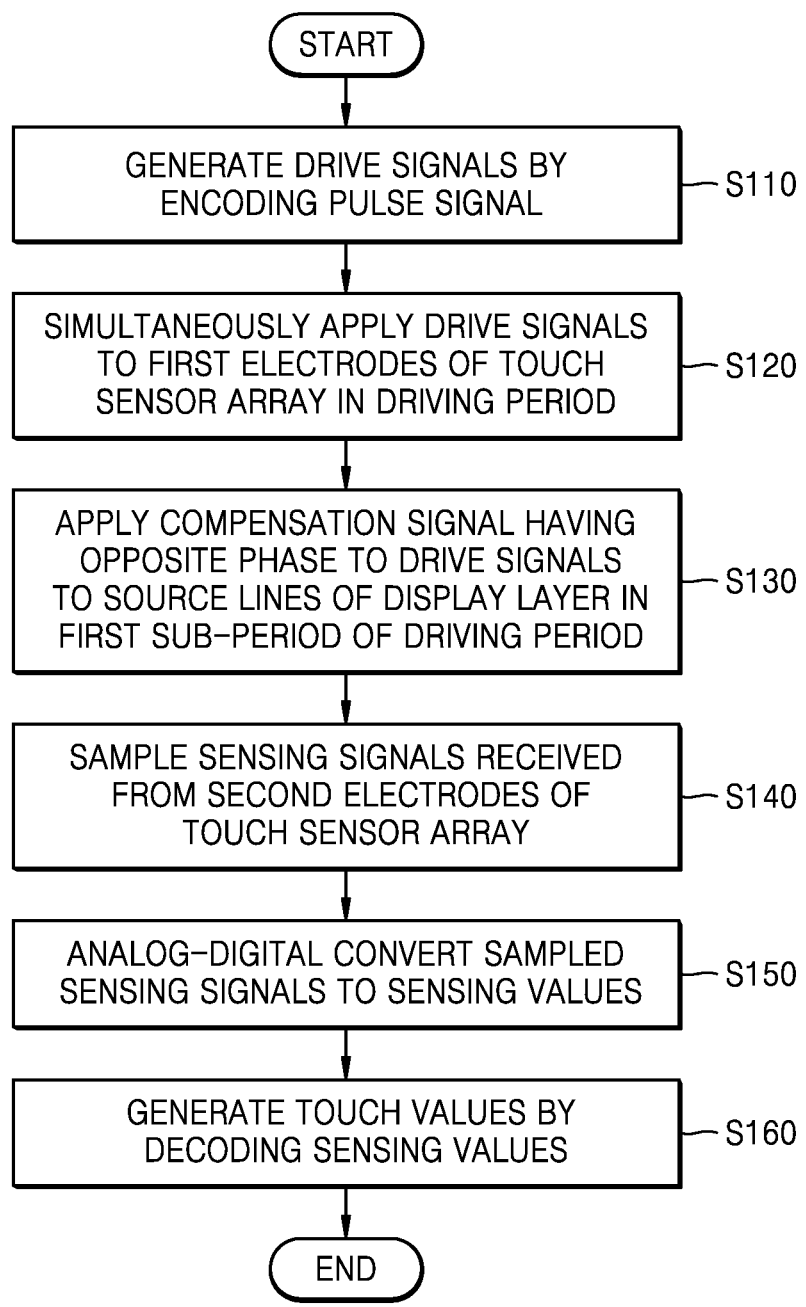
FIG. 12 is a flowchart of a method of operating a touch screen driving circuit that drives a touch screen, according to an example embodiment.

FIG. 12 is a flowchart of a method of operating a touch screen driving circuit that drives a touch screen, according to an example embodiment. The operation method of FIG. 12 may be performed in the driving circuit 200 of FIG. 1, and accordingly, the contents described with reference to FIGS. 1 to 11 may be applied thereto.

Referring to FIG. 12, the encoder 215 of the touch controller 210 may generate a plurality of drive signals by encoding a plurality of pulse signals having a certain frequency (S110). For example, the encoder 215 may perform encoding by using a specific matrix, for example, the Hadamard matrix. The drive signals may all include a section having the same phase.

The driving circuit 211 of the touch controller 210 may simultaneously apply a drive signal to the touch sensor layer, or a plurality of first electrodes, for example, the driving electrodes TEs, of the touch panel 110, in the driving period (S120).

The source driver 222 of the DDI 220 may apply a plurality of compensation signals having a phase opposite to each of the drive signals to each of a plurality of source lines of the display layer in the first sub-period of the driving period (S130). In the first sub-period, all phases of the drive signals may be the same or the sum of the phases of the drive signals may be greater than or less than zero. The compensation signal may have the same frequency as and a phase opposite to the drive signal.

The receiving circuit 212 of the touch controller 210 may sample a plurality of sensing signals received from a plurality of second electrodes, for example, the receiving electrodes REs, of the touch sensor layer (S140).

The receiving circuit 212 may analog-digital convert the sampled sensing signals to a plurality of sensing values (S150).

The decoder 216 of the touch controller 210 may generate a plurality of touch values by decoding the sensing values (S160). The decoder 216 may perform decoding based on the matrix used in the encoding in S110, for example, an inverse matrix of the matrix.

Then, the touch processor 213 of the touch controller 210 may identify a touch, touch coordinates, and/or touch strength (pressure) based on the touch values.

Figure 13:
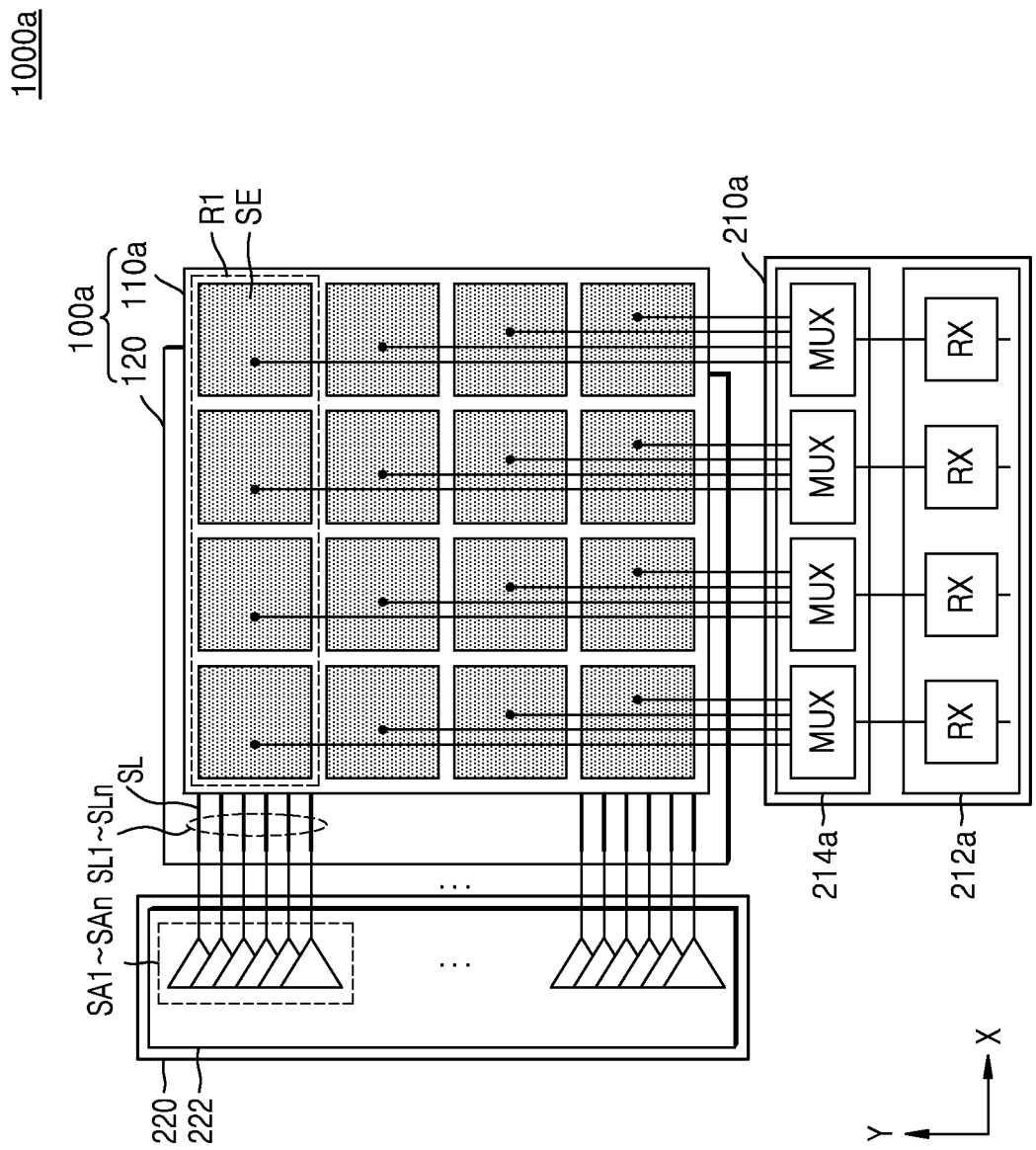
FIG. 13 is a view of a touch screen device according to an example embodiment.

FIG. 13 is a view of a touch screen device 1000a according to an example embodiment.

Referring to FIG. 13, the touch screen device 1000a may include a touch screen 100a, a touch controller 210a, and the DDI 220. The touch screen 100a may include a touch panel 110a and the display panel 120, and the touch panel 110a may include the sensing electrodes SEs (i.e., dot sensing electrodes or dot sensors) arranged in a matrix. The touch panel 110a may be sensed by a self-capacitance method.

In an example embodiment, the touch controller 210a may include a receiving circuit 212a and a selection circuit 214a, the receiving circuit 212a may include the receivers RXs, and the selection circuit 214a may include a plurality of selectors, for example, multiplexers MUXs.

The receivers RXs may operate as transmitters, for example, the first to fourth transmitters TX1 to TX4, and the receivers RXs. The sensing electrodes SEs may be connected, as column units, to the same multiplexer MUX, and the sensing electrode SE selected by the multiplexer MUX may be electrically connected to the receivers RXs. A drive signal may be applied to the sensing electrode SE selected by the multiplexer MUX through the receivers RXs, and a sensing signal generated based on the drive signal may be output to the receivers RXs.

The touch controller 210a may further include an encoder, a decoder, and a touch processor. The operations of an encoder, a decoder, and a touch processor may be the same as the operations of the encoder 215, the decoder 216, and the touch processor 213 of FIG. 2. The encoder may generate a plurality of drive signals by encoding a plurality of pulse signals based on a specific matrix, for example, the Hadamard matrix, and the decoder may decode a plurality of sensing signals based on the matrix (i.e., an inverse matrix of the matrix).

When the sensing electrodes SEs arranged in one row, for example, a first row R1, of the touch panel 110a is unbalanced driven in the first sub-period of the driving period, that is, when a plurality of pulse signals having the same phase and frequency are applied to the sensing electrodes SEs of the first row R1, a plurality of compensation signals having the same frequency and a phase different from the pulse signals may be applied to at least some of a plurality of source lines. Accordingly, the voltage of the common electrode of the display panel 120 may be maintained constant, and the sensing signals output from the first row R1 may not include noise due to the drive signals.

In an example embodiment, the first to n-th source amplifiers SA1 to SAn included in the source driver 222 may apply the compensation signals to the first to n-th source lines SL1 to SLn. An area on the display panel 120, in which the first to n-th source lines SL1 to SLn are arranged may vertically overlap an area of the first row R1 of the touch panel 110a. However, example embodiments are not limited thereto, and the compensation signals may be applied to the source lines SLs arranged in the display panel 120.

Figure 14:
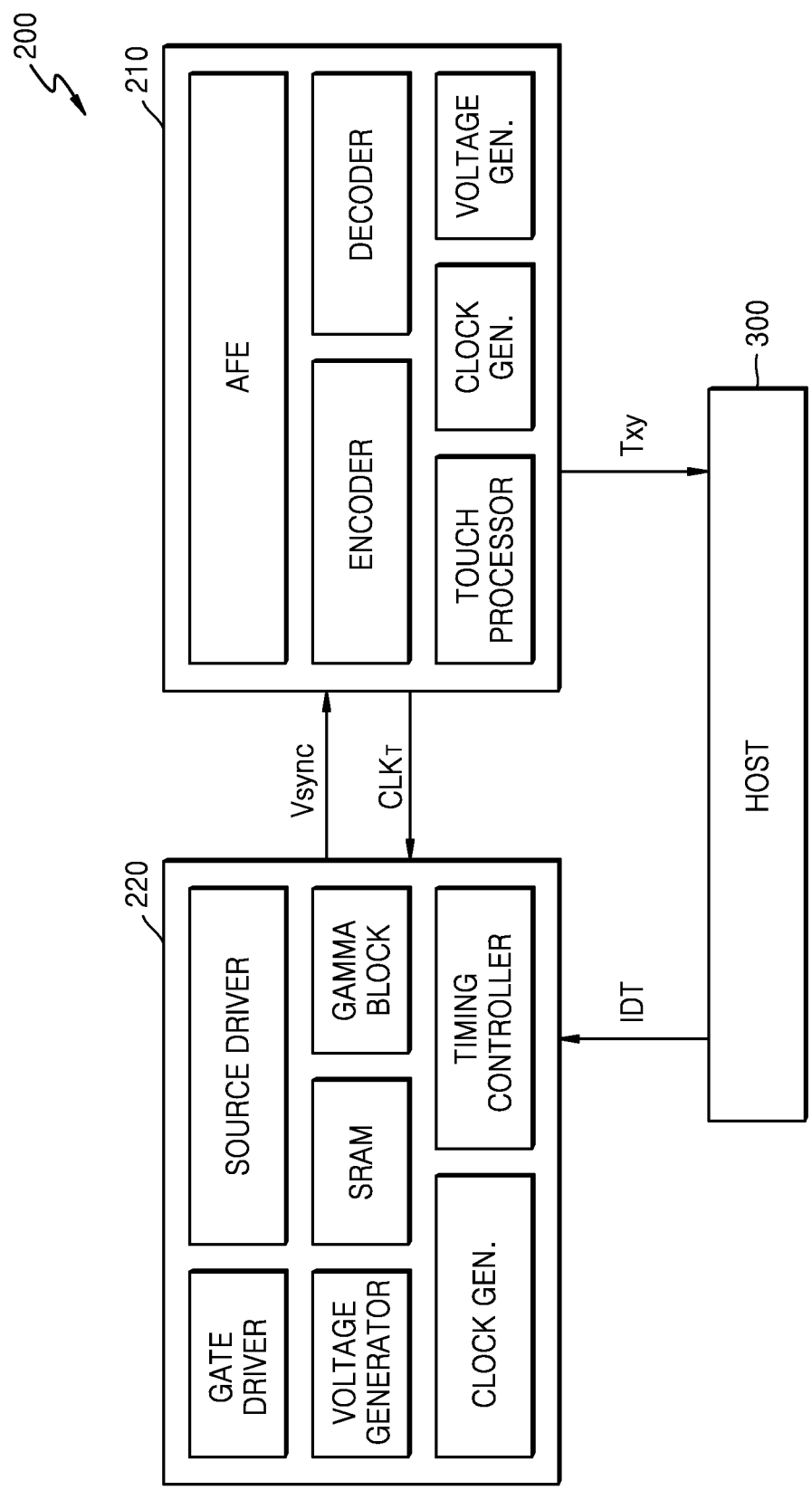
FIGS. 14 and 15 are views of touch screen driving circuits according to example embodiments.
Figure 15:
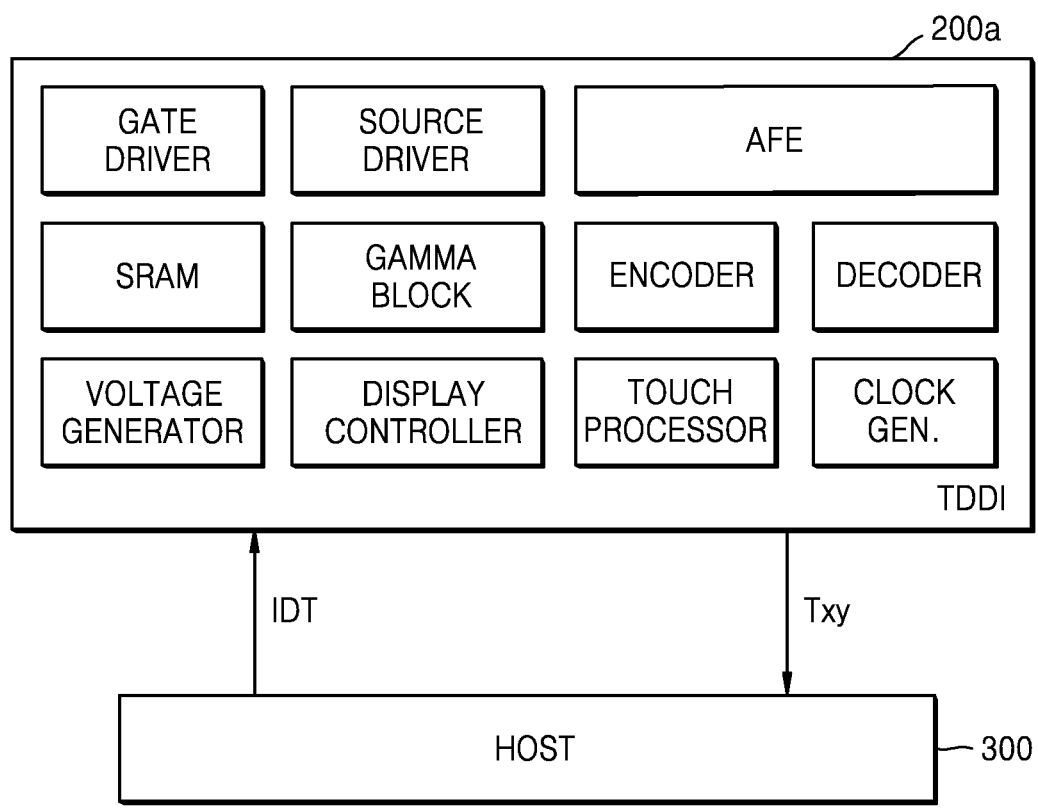

FIGS. 14 and 15 are views of touch screen driving circuits according to example embodiments.

Referring to FIG. 14, the driving circuit 200 may include the touch controller 210 and the DDI 220. In an example embodiment, the touch controller 210 and the DDI 220 may be implemented as separate semiconductor chips. In an example embodiment, at least one of the touch controller 210 or the DDI 220 may be implemented by a plurality of semiconductor chips.

The touch controller 210 and the DDI 220 may be operated under the control of the host 300, the DDI 220 may receive the image data IDT from the host 300, and the display panel 120 may be driven to display an image on the display panel 120 of FIG. 1 according to the image data IDT.

The touch controller 210 may scan the touch panel 110 of FIG. 1, calculate the touch coordinates Txy based on the sensing signals received from the touch panel 110, and provide the touch coordinates Txy to the host 300.

Referring to FIG. 14, the touch controller 210 may include an analog-front end (AFE), an encoder, a decoder, a touch processor, a clock generator, and a voltage generator. In addition, the touch controller 210 may include interface circuits for communication with the host 300 and the DDI 220. As a non-limiting example, the interface circuit for communication with the host 300 may be implemented by one of various interfaces such as a universal serial bus (USB) interface, a universal flash storage (USF) interface, a multimedia controller (MMC) interface, an embedded MMC (eMMC) interface, a peripheral component interconnect express (PCIe) interface, an advanced technology attachment (ATA) interface, a serial advanced technology attachment (SATA) interface, a parallel advanced technology attachment (PATA) interface, a small computer system interface (SCSI), a serial attached SCSI (SAS), an enhanced small disk interface (ESDI), an integrated drive electronics (IDE) interface, a high-speed serial interface, and the like, and the interface circuit for communication with the DDI 220 may be implemented by one method of a universal asynchronous receiver transmitter (UART) interface, an inter integrated circuit (I2C) interface, a serial peripheral interface (SPI), a mobile industry processor interface (MIPI), an embedded display port (eDP) interface.

The AFE may include the driving circuit 211 of FIG. 2 and the receiving circuit 212 of FIG. 2. The AFE may further include a selection circuit, for example, the selection circuit 214A of FIG. 13.

The clock generator may generate a clock signal used in the touch controller 210, for example, the touch clock signal $CLK_T$ provided to the driving circuit and the receiving circuit, and the voltage generator may generate voltages used in the AFE.

As the operations of the encoder, the decoder, and the touch processor and the components, for example, the driving circuit, of the AFE, and the operations of the receiving circuit are already described above with reference to FIG. 2, redundant descriptions thereof are omitted.

The DDI 220 may include a clock generator, a timing controller, a voltage generator, a gamma block, SRAM, a gate driver, and a source driver. In addition, the display driving integrated circuit DDI may include interface circuits for communication with the host 130 and the touch driving circuit TDI.

The clock generator may generate clock signals used in the DDI 220, for example, clock signals provided to the source driver and the gate driver. The voltage generator may generate voltage used in the gate driver and the source driver, and the gamma block may generate a plurality of grayscale voltages corresponding to a plurality of grayscales that pixel values may have, and provide the generated grayscale voltages to the source driver. SRAM may store the image data IDT received from the host 300. For example, SRAM may store the image data IDT in units of a plurality of lines or the image data IDT in one frame, and provide the image data IDT to the source driver in units of lines.

The operations of the gate driver, the source driver, and the timing controller are already described above with reference to FIG. 2, redundant descriptions thereof are omitted.

The DDI 220 may provide a signal indicating display timing, for example, the vertical synchronous signal Vsync, to the touch controller 210. The touch controller 210 may provide touch sensing timing information, for example, the touch clock signal $CLK_T$, to the driving circuit 200. The Touch controller 210 and the DDI 220 may be operated in synchronism with each other based on a synchronous signal, for example, the vertical synchronous signal Vsync and the touch clock signal $CLK_T$. For example, the touch controller 210, in response to the vertical synchronous signal Vsync, may perform unbalanced driving in the period in which no image is updated in the display panel 120, and in the DDI 220, the source driver, in response to the touch clock signal $CLK_T$, may generate a plurality of compensation signals having the same frequency as and a phase opposite to a plurality of drive signals, and output the compensation signals to the source lines.

Referring to FIG. 15, a touch screen driving circuit 200a may include an AFE, an encoder, a decoder, and a touch processor for driving the touch panel 110 of FIG. 1, and a gate driver, a source driver, SRAM, a gamma block, and a timing controller for driving the display panel 120 of FIG. 1. Furthermore, the touch screen driving circuit 200a may include a clock signal generator for generating at least one clock signal used therein, and a voltage generator for generating a plurality of voltages. The touch screen driving circuit 200a may further include an interface circuit for communication with the host 300.

The touch screen driving circuit 200a may be integrated on a single semiconductor chip, and the touch screen driving circuit 200a may be referred to as the touch display driving circuit TDDI. In an example embodiment, digital circuits, for example, a touch processor, an encoder, a decoder, SRAM, a timing controller, and a clock signal generator may be integrated on a single semiconductor chip, and analog circuits, for example, AFE, a gate driver, a source driver, a gamma block, and a voltage generator may be integrated on one or more separated semiconductor chips.

While example embodiments have been particularly shown and described, it will be understood that various changes in form and details may be made therein without departing from the spirit and scope of the following claims.

What is claimed is:

1. A touch screen driving circuit for driving a touch screen, the touch screen comprising a display layer and a touch sensor layer on the display layer, the touch screen driving circuit comprising:
 a touch controller configured to provide a plurality of drive signals respectively to a plurality of first electrodes of the touch sensor layer, in a driving period, wherein the plurality of drive signals are phase synchronized during a first sub-period of the driving period; and
 a display driving circuit configured to provide a compensation signal to at least some of a plurality of source lines of the display layer in the first sub-period of the driving period, wherein the compensation signal is phase synchronized opposite to the plurality of drive signals in the first sub-period.

2. The touch screen driving circuit of claim 1, wherein a first frequency of the plurality of drive signals corresponds to a second frequency of the compensation signal.

3. The touch screen driving circuit of claim 1, wherein, in a second sub-period following the first sub-period, a first group of the plurality of drive signals are phase synchronized and a second group of the plurality of drive signals are phase synchronized opposite to the first group of the plurality of drive signals, and a sum of the phases of the plurality of drive signals is zero.

4. The touch screen driving circuit of claim 1, wherein the display driving circuit is further configured to provide a display timing signal to the touch controller, and
 wherein the first sub-period is included in a porch period of the display timing signal, which corresponds to a period in which display is not performed.

5. The touch screen driving circuit of claim 1, wherein the display driving circuit is further configured to receive touch driving information comprising information about frequencies of the plurality of drive signals, and generate the compensation signal based on the touch driving information.

6. The touch screen driving circuit of claim 1, wherein, in a second sub-period following the first sub-period, a first group of the plurality of drive signals have a first polarization, and a second group of the plurality of drive signals have a second polarization.

7. The touch screen driving circuit of claim 1, wherein the touch controller is further configured to generate the plurality of drive signals by encoding a pulse signal having a first frequency based on a first matrix.

8. The touch screen driving circuit of claim 7, wherein the touch controller is further configured to receive a plurality of sensing signals generated based on the plurality of drive signals from a plurality of second electrodes of the touch sensor layer, convert the plurality of sensing signals to a plurality of digital sensing values, and generate a plurality of touch values by decoding the plurality of digital sensing values based on an inverse matrix of the first matrix.

9. The touch screen driving circuit of claim 1, wherein the plurality of first electrodes extend in a first direction and the plurality of source lines extend in the first direction.

10. The touch screen driving circuit of claim 1, wherein the touch controller and the display driving circuit are formed on a common substrate.

11. A touch controller for driving a touch sensor array on a display panel, the touch controller comprising:
 a controller configured to receive a display timing signal and generate a touch sensing control signal based on the display timing signal; and a driving circuit configured to provide, based on the touch sensing control signal, a plurality of drive signals having a first frequency respectively to a plurality of driving electrodes of the touch sensor array, wherein the plurality of drive signals have a second polarization opposite to a first polarization in a first period during which a compensation signal having the first polarization and the first frequency is provided to a plurality of source lines of the display panel.

12. The touch controller of claim 11, wherein, in the first period, a sum of phases of the plurality of drive signals is greater than zero.

13. The touch controller of claim 11, wherein, in a second period following the first period, a first group of the plurality of drive signals have the first polarization, and a second group of the plurality of drive signals have the second polarization.

14. The touch controller of claim 11, further comprising an encoder configured to generate the plurality of drive signals by encoding a pulse signal having the first frequency based on a first matrix.

15. The touch controller of claim 14, wherein the first matrix comprises a Hadamard matrix.

16. A method of operating a touch screen driving circuit to drive a touch screen which includes a display layer and a touch sensor layer on the display layer, the method comprising:

providing a plurality of drive signals respectively to a plurality of first electrodes of the touch sensor layer in a driving period, wherein the plurality of drive signals are phase synchronized during a first sub-period of the driving period; and providing a compensation signal to a plurality of source lines of the display layer in the first sub-period of the driving period, wherein the compensation signal is phase synchronized opposite to the plurality of drive signals in the first sub-period.

17. The method of claim 16, further comprising driving the display layer to display an image in a second sub-period of the driving period following the first sub-period.

18. The method of claim 16, wherein a sum of the phases of the plurality of drive signals is zero in a second sub-period of the driving period following the first sub-period.

19. The method of claim 16, further comprising generating the plurality of drive signals by encoding a pulse signal.

20. The method of claim 16, further comprising:
sampling a plurality of sensing signals received from a plurality of second electrodes of the touch sensor layer;
converting the plurality of sensing signals that are sampled, to a plurality of digital sensing values; and
generating a plurality of touch values by decoding the plurality of digital sensing values.

* * * * *